(12) United States Patent
Seo et al.

(10) Patent No.: US 9,356,682 B2
(45) Date of Patent: *May 31, 2016

(54) BACKHAUL DOWNLINK SIGNAL DECODING METHOD OF RELAY STATION AND RELAY STATION USING SAME

(71) Applicant: LG Electronics Inc., Seoul (KR)

(72) Inventors: Han Byul Seo, Anyang-si (KR); Dae Won Lee, Anyang-si (KR); Byoung Hoon Kim, Anyang-si (KR); Hak Seong Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/738,519

(22) Filed: Jun. 12, 2015

(65) Prior Publication Data

US 2015/0280809 A1    Oct. 1, 2015

Related U.S. Application Data

(63) Continuation of application No. 14/313,848, filed on Jun. 24, 2014, now Pat. No. 9,083,435, which is a continuation of application No. 13/503,740, filed as application No. PCT/KR2010/007274 on Oct. 22, (Continued)

(30) Foreign Application Priority Data

Aug. 10, 2010   (KR) .................. 10-2010-0076740

(51) Int. Cl.
*H04B 7/14*    (2006.01)
*H04W 4/00*   (2009.01)
(Continued)

(52) U.S. Cl.
CPC ............ *H04B 7/15542* (2013.01); *H04B 7/155* (2013.01); *H04B 7/2606* (2013.01);
(Continued)

(58) Field of Classification Search
None
See application file for complete search history.

(56) References Cited

U.S. PATENT DOCUMENTS

| 2008/0045141 A1 | 2/2008 | Suga |
| 2008/0220790 A1 | 9/2008 | Cai et al. |

(Continued)

FOREIGN PATENT DOCUMENTS

| CN | 101127552 A | 2/2008 |
| CN | 101472292 A | 7/2009 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)," 3GPP TS 36.211, V8.8.0, Sep. 2009, pp. 1 to 83.

(Continued)

*Primary Examiner* — Chi H Pham
*Assistant Examiner* — Soon-Dong D Hyun
(74) *Attorney, Agent, or Firm* — Birch, Stewart, Kolasch & Birch, LLP

(57) ABSTRACT

A method of decoding a backhaul downlink signal of a relay node (RN). A higher layer signal indicating a maximum transmission rank is received from a base station (BS). Control information is received through a relay control channel from the BS. The control information is demodulated and mapped to resource elements (REs) which do not overlap with user equipment-specific reference signal (URS) REs in a control region which is used for the relay control channel transmission of the BS. The URS REs are reserved REs for URSs according to the maximum transmission rank. The control information is demodulated based on URSs transmitted by the BS on one fixed antenna port n, where n is a natural number.

14 Claims, 22 Drawing Sheets

Related U.S. Application Data 2010, now Pat. No. 8,787,245.

(60) Provisional application No. 61/254,744, filed on Oct. 25, 2009, provisional application No. 61/256,272, filed on Oct. 29, 2009, provisional application No. 61/307,409, filed on Feb. 23, 2010, provisional application No. 61/322,816, filed on Apr. 9, 2010, provisional application No. 61/322,908, filed on Apr. 11, 2010, provisional application No. 61/325,353, filed on Apr. 18, 2010, provisional application No. 61/334,582, filed on May 14, 2010, provisional application No. 61/357,513, filed on Jun. 22, 2010.

(51) Int. Cl.
*H04W 72/06* (2009.01)
*H04B 7/155* (2006.01)
*H04B 7/26* (2006.01)
*H04L 5/00* (2006.01)
*H04L 27/26* (2006.01)

(52) U.S. Cl.
CPC ............ *H04L5/0005* (2013.01); *H04L 5/0023* (2013.01); *H04L 5/0051* (2013.01); *H04L 5/0053* (2013.01); *H04L 27/2647* (2013.01)

(56) References Cited

U.S. PATENT DOCUMENTS

| | | |
|---|---|---|
| 2009/0252077 A1 | 10/2009 | Khandekar et al. |
| 2010/0027694 A1 | 2/2010 | Touboul et al. |
| 2010/0097978 A1 | 4/2010 | Palanki et al. |
| 2010/0111070 A1 | 5/2010 | Hsu |
| 2010/0322146 A1 | 12/2010 | Liu et al. |
| 2011/0128883 A1 | 6/2011 | Chung et al. |
| 2011/0142104 A1 | 6/2011 | Coldrey et al. |
| 2011/0170474 A1 | 7/2011 | Ji et al. |
| 2011/0207415 A1 | 8/2011 | Luo et al. |
| 2012/0020323 A1 | 1/2012 | Noh et al. |
| 2012/0155561 A1 | 6/2012 | Seo et al. |
| 2013/0005382 A1 | 1/2013 | Landström et al. |
| 2013/0064174 A1 | 3/2013 | Kim et al. |
| 2013/0237228 A1 | 9/2013 | Womack et al. |

FOREIGN PATENT DOCUMENTS

| | | |
|---|---|---|
| CN | 102625978 A | 8/2012 |
| EP | 2 076 086 A2 | 7/2009 |
| JP | 2010-521109 A | 6/2010 |
| WO | WO 2008/127814 A1 | 10/2008 |
| WO | WO 2010/013962 A2 | 2/2010 |

OTHER PUBLICATIONS

LG Electronics Inc., "Consideration on Demodulation RS in the DL Backhaul", R1-094801, TSG-RAN WG1 Meeting #59, Nov. 9-13, 2009, 3 pages.

Panasonic, "Further Views on Downlink Multi-User MIMO Operation for LTE-Advanced," 3GPP TSG RAN WG1 Meeting #58bis, Agenda Item 7.5.1 DL Single-Cell MU-MIMO, R1-094510, Nov. 9-13, 2009, Jeju, Korea, 3 pages.

ZTE, "Considerations on Demodulation Reference Signal in Backhaul Downlink", R1-093204, TSG-RAN WG1 #58, Aug. 24-28, 2009, 6 pages.

BACKHAUL DOWNLINK SIGNAL DECODING METHOD OF RELAY STATION AND RELAY STATION USING SAME

CROSS REFERENCE TO RELATED APPLICATIONS

This application is a Continuation of co-pending U.S. patent application Ser. No. 14/313,848 filed Jun. 24, 2014, which is a Continuation of U.S. patent application Ser. No. 13/503,740 (now U.S. Pat. No. 8,787,245, issued on Jul. 22, 2014) filed on Apr. 24, 2012, which is the National Phase of PCT/KR2010/007274 filed on Oct. 22, 2010, which claims priority under 35 U.S.C. §119(e) to U.S. Provisional Application Nos. 61/254,744 filed on Oct. 25, 2009, 61/256,272 filed on Oct. 29, 2009, 61/307,409 filed on Feb. 23, 2010, 61/322,816 filed on Apr. 9, 2010, 61/322,908 filed on Apr. 11, 2010, 61/325,353 filed on Apr. 18, 2010, 61/334,582 filed on May 14, 2010, and 61/357,513 filed on Jun. 22, 2010, and under 35 U.S.C. §119(a) to Patent Application No. 10-2010-0076740 filed in the Republic of Korea on Aug. 10, 2010, all of which are hereby expressly incorporated by reference into the present application.

BACKGROUND OF THE INVENTION

1. Field of the Invention

The present invention relates to wireless communications, and more particularly, to a method of decoding a backhaul downlink signal received by a relay station from a base station in a wireless communication system including the relay station, and the relay station using the method.

2. Discussion of the Related Art

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced is one of promising candidates for the IMT-advanced. A technology related to a relay station is one of main technologies for the LTE-advanced.

The relay station is a device for relaying a signal between a base station and a user equipment, and is used for cell coverage extension and throughput enhancement of a wireless communication system.

When the relay station receives a backhaul downlink signal from the base station, there is an issue on which reference signal will be used to demodulate the backhaul downlink signal. For example, in order to demodulate control information of a control channel transmitted by the base station to the relay station, there is a need to know which reference signal is mapped to a radio resource region to which the control information is allocated.

SUMMARY OF THE INVENTION

The present invention provides a method of decoding a backhaul downlink signal received by a relay station from a base station, and also provides the relay station using the method.

According to one aspect of the present invention, a method of deciding a backhaul downlink signal of a relay station is provided. The method includes: receiving by the relay station a transmission rank value for a backhaul downlink from a base station through a high-layer signal; receiving control information from the base station through a control region; and decoding the control information, wherein the transmission rank value for the backhaul downlink is a transmission rank value assumed when the relay station decodes the control information, and wherein the control information is mapped to a resource element which does not overlap with a dedicated reference signal resource element mapped to the control region by assuming the transmission rank value for the backhaul downlink.

In the aforementioned aspect of the present invention, the transmission rank value for the backhaul downlink may be equal to a maximum rank value that can be transmitted between the base station and at least one relay station connected thereto.

In addition, the transmission rank value for the backhaul downlink may be equal to a maximum rank value that can be transmitted between the base station and the relay station.

In addition, the method further includes: receiving data from the base station through a data region; and decoding the data. The dedicated reference signal used to decode the data may be indicated by the control information.

In addition, the control information may include a rank value for the data region.

In addition, the high-layer signal may be a radio resource control (RRC) message.

In addition, the control region may include a plurality of orthogonal frequency division multiplexing (OFDM) symbols in a time domain, and may include OFDM symbols for transmitting a control channel by the base station to a macro user equipment in a subframe including a plurality of subcarriers and at least one OFDM symbol located after a guard time required for transmission and reception switching of the relay station in a frequency domain.

In addition, the method further includes: receiving control information from the base station through the data region; and decoding the control information received through the data region. The control information received through the data region may be decoded by assuming a predetermined transmission rank value and a dedicated reference signal overhead based on the predetermined transmission rank value.

According to another aspect of the present invention, there is provided a relay station including: a radio frequency (RF) unit for transmitting and receiving a radio signal; and a processor coupled to the RF unit, wherein the processor is configured for: receiving a transmission rank value for a backhaul downlink from a base station through a high-layer signal; receiving control information from the base station through a control region; and decoding the control information, wherein the transmission rank value for the backhaul downlink is a transmission rank value assumed when the relay station decodes the control information, and wherein the control information is mapped to a resource element which does not overlap with a dedicated reference signal resource element mapped to the control region by assuming the transmission rank value for the backhaul downlink.

According to the present invention, a relay station can know a reference signal and a transmission rank used to determine an overhead of the reference signal when decoding control information received from a base station through a high-layer signal, thereby being able to correctly demodulate a control channel. In addition, even if a data channel and a control channel received from the base station have different transmission ranks, the control channel can be correctly demodulated.

DETAILED DESCRIPTION OF THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE. For clarity, the following description will focus on the 3GPP LTE/LTE-A. However, technical features of the present invention are not limited thereto.

Figure 1:
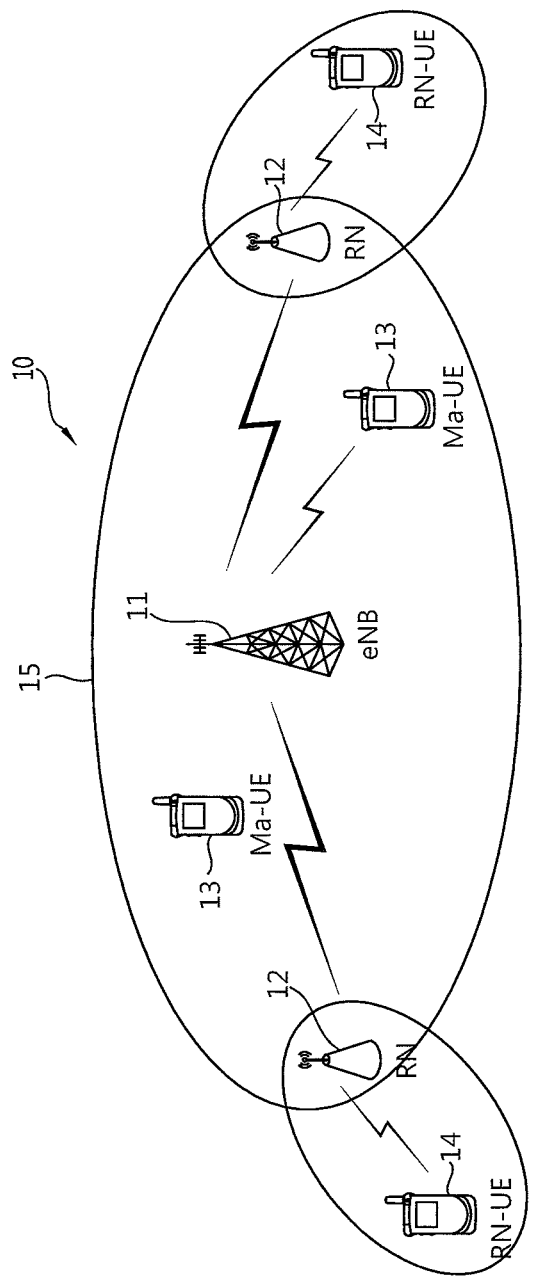
FIG. 1 shows a wireless communication system employing a relay node (RN).

FIG. 1 shows a wireless communication system employing a relay node (RN).

Referring to FIG. 1, the wireless communication system 10 employing the RN includes at least one eNodeB (eNB) 11. Each eNB 11 provides a communication service to a specific geographical region 15 generally referred to as a cell. The cell can be divided into a plurality of regions, and each region can be referred to as a sector. One or more cells may exist in the coverage of one eNB. The eNB 11 is generally a fixed station that communicates with a user equipment (UE) 13 and may be referred to as another terminology, such as a base station (BS), a base transceiver system (BTS), an access point, an access network (AN), etc. The eNB 11 can perform functions such as connectivity between an RN 12 and a UE 14, management, control, resource allocation, etc.

The RN 12 is a device for relaying a signal between the eNB 11 and the UE 14, and is also referred to as another terminology such as a relay station (RS), a repeater, a relay, etc. A relay scheme used in the RN may be either amplify and forward (AF) or decode and forward (DF), and the technical features of the present invention are not limited thereto.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. Hereinafter, a macro UE (or Ma-UE) 13 denotes a UE that directly communicates with the eNB 11, and a relay node-UE (RN-UE) 14 denotes a UE that communicates with the RN. Even if the Ma-UE 13 exists in a cell of the eNB 11, the Ma-UE 13 can communicate with the eNB 11 via the RN 12 to improve a data transfer rate depending on a diversity effect.

Figure 2:
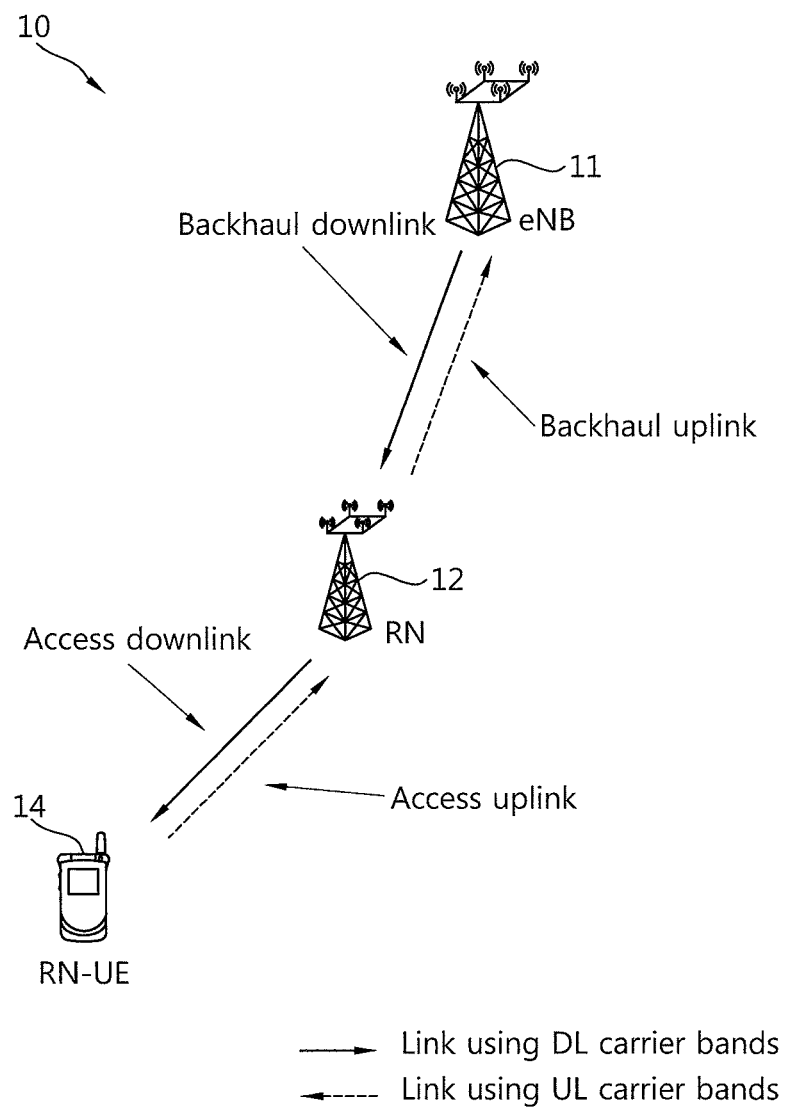
FIG. 2 shows a link which exists in a wireless communication system including an RN.

FIG. 2 shows a link which exists in a wireless communication system including an RN.

The wireless communication system including the RN located between an eNB and a UE may have a link different from that of a wireless communication system having only the eNB and the UE. Between the eNB and the UE, a downlink implies a communication link from the eNB to the UE, and an uplink implies a communication link from the UE to the eNB. When using time division duplex (TDD), downlink transmission and uplink transmission are performed in different subframes. When using frequency division duplex (FDD), downlink transmission and uplink transmission are performed in different frequency bands. In the TDD, downlink transmission and uplink transmission are performed at different times and can use the same frequency band. On the other hand, in the FDD, downlink transmission and uplink transmission can be performed at the same time, and use different frequency bands.

When the RN is located between the eNB and the UE, a backhaul link and an access link can be added in addition to the aforementioned uplink and downlink. The backhaul link refers to a communication link between the eNB and the RN, and includes a backhaul downlink on which the eNB transmits a signal to the RN and a backhaul uplink on which the RN transmits a signal to the eNB. The access link refers to a communication link between the RN and the UE connected to the RN (hereinafter, such a UE is referred to as an RN-UE). The access link includes an access downlink on which the RN transmits a signal to the RN-UE and an access uplink on which the RN-UE transmits a signal to the RN.

Figure 3:
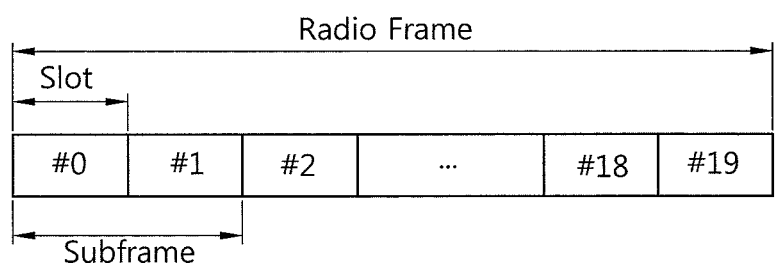
FIG. 3 shows a radio frame structure of $3^{rd}$ generation partnership project (3GPP) long term evolution (LTE).

FIG. 3 shows a radio frame structure of 3GPP LTE.

Referring to FIG. 3, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. Since the 3GPP LTE uses OFDMA in downlink transmission, the OFDM symbol is for representing one symbol period, and can be referred to as other terms. For example, the OFDM symbol can also be referred to as an SC-FDMA symbol when SC-FDMA is used as an uplink multiple-access scheme. Although it is described herein that one slot includes 7 OFDM symbols, the number of OFDM symbols included in one slot may change depending on a cyclic prefix (CP) length. According to 3GPP TS 36.211 V8.5.0(2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously. Hereinafter, a symbol may imply one OFDM symbol or one SC-FDMA symbol.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference to explain the radio frame structure described with reference to FIG. 3.

Figure 4:
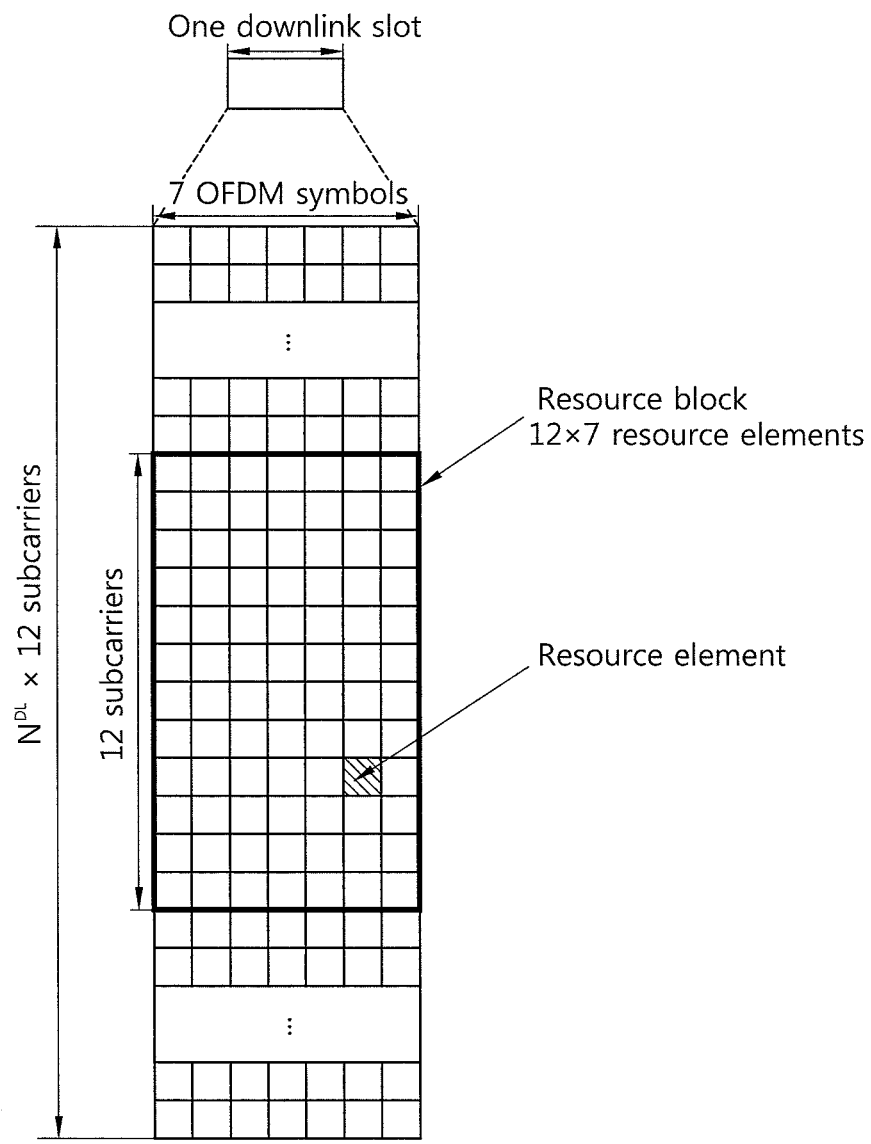
FIG. 4 shows an example of a resource grid for one downlink slot.

FIG. 4 shows an example of a resource grid for one downlink slot.

In FDD and TDD radio frames, one slot includes a plurality of OFDM symbols in a time domain and a plurality of resource blocks (RBs) in a frequency domain. The RB is a resource allocation unit, and includes a plurality of consecutive subcarriers in one slot.

Referring to FIG. 4, although it is described herein that one downlink slot includes 7 OFDM symbols and one RB includes 12 subcarriers in the frequency domain, this is for exemplary purposes only, and thus the present invention is not limited thereto. A subcarrier spacing may be, for example, 15 kHz in the RB.

Each element on the resource grid is referred to as a resource element, and one RB includes 12×7 resource elements. The number $N^{DL}$ of RBs included in the downlink slot depends on a downlink transmission bandwidth determined in a cell. The resource grid described in FIG. 4 can also apply to uplink transmission.

Figure 5:
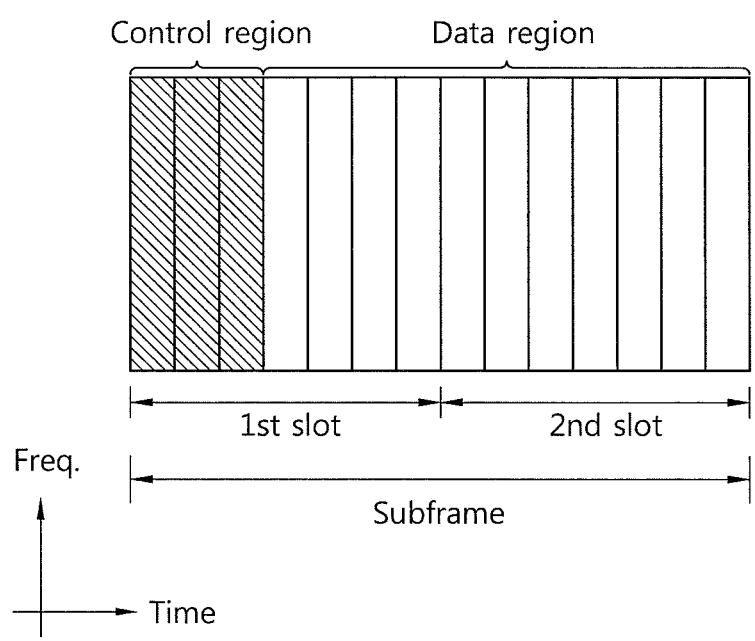
FIG. 5 shows a structure of a downlink subframe.

FIG. 5 shows a structure of a downlink subframe.

Referring to FIG. 5, the subframe includes two consecutive slots. A maximum of three OFDM symbols located in a front portion of a $1^{st}$ slot within the subframe correspond to a control region to which a physical downlink control channel (PDCCH) is allocated. The remaining OFDM symbols correspond to a data region to which a physical downlink shared channel (PDSCH) is allocated. In addition to the PDCCH, control channels such as a physical control format indicator channel (PCFICH), a physical hybrid automatic repeat request (HARM) indicator channel (PHICH), etc., can be allocated to the control region. A UE can read data information transmitted through the PDSCH by decoding control information transmitted through the PDCCH. Although the control region includes three OFDM symbols herein, this is for exemplary purposes only. Thus, two OFDM symbols or one OFDM symbol may be included in the control region. The number of OFDM symbols included in the control region of the subframe can be known by using the PCFICH. The PHICH carries information indicating whether uplink data transmitted by the UE is successfully received.

The control region consists of a plurality of control channel elements (CCEs) as a logical CCE stream. Hereinafter, the CCE stream denotes a set of all CCEs constituting the control region in one subframe. The CCE corresponds to a plurality of resource element groups (REGs). For example, the CCE may correspond to 9 REGs. The REG is used to define mapping of a control channel onto a resource element. For example, one REG may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. The number of CCEs used for PDCCH transmission is referred to as a CCE aggregation level. In addition, the CCE aggregation level is a CCE unit for searching for the PDCCH. A size of the CCE aggregation level is defined by the number of contiguous CCEs. For example, the CCE aggregation level may be an element of $\{1, 2, 4, 8\}$.

Control information transmitted through the PDCCH is referred to as downlink control information (hereinafter, DCI). The DCI includes uplink scheduling information, downlink scheduling information, system information, an uplink power control command, control information for paging, control information for indicating a random access channel (RACH) response, etc.

Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 1D for scheduling of the PDSCH in a multi-user spatial multiplexing mode, a format 2 for scheduling of the PDSCH in a closed-loop spatial multiplexing mode, a format 2A for scheduling of the PDSCH in an open-loop spatial multiplexing mode, a format 3 for transmission of a transmission power control (TPC) command for 2-bit power control for the PUCCH and the PUSCH, and a format 3A for transmission of a TPC command for 1-bit power control for the PUCCH and the PUSCH.

Figure 6:
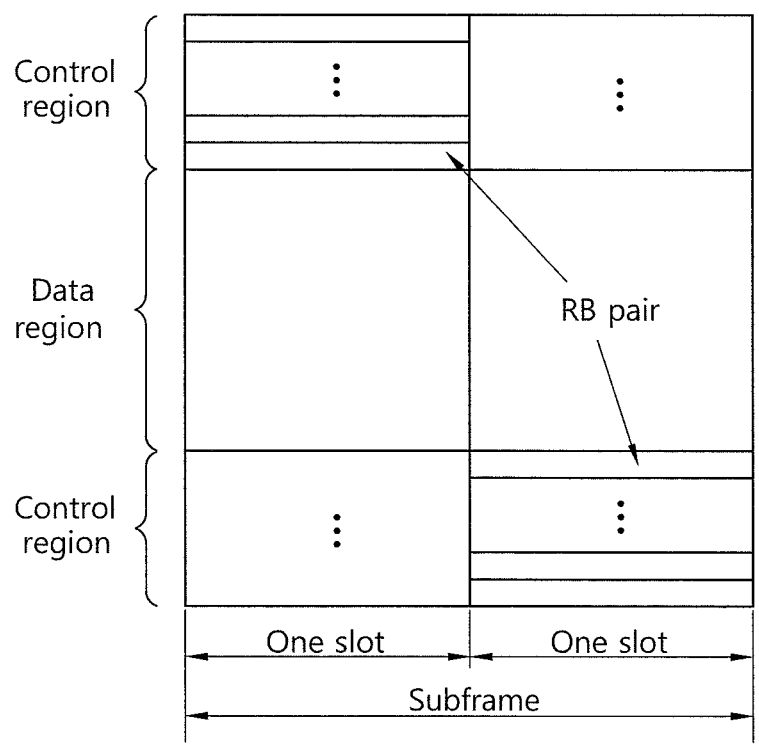
FIG. 6 shows a structure of an uplink subframe.

FIG. 6 shows a structure of an uplink subframe.

Referring to FIG. 6, the uplink subframe can be divided into a control region and a data region in frequency domain. The control region is a region to which a physical uplink control channel (PUCCH) for carrying uplink control information is allocated. The data region is a region to which a physical uplink shared channel (PUSCH) for carrying user data is allocated.

The PUCCH for one UE is allocated in a pair of RBs. The RBs belonging to the RB pair occupy different subcarriers in each of two slots. This is called that the RB pair allocated to the PUCCH is frequency-hopped in a slot boundary.

The PUCCH can support multiple formats. That is, uplink control information having a different number of bits for each subframe can be transmitted according to a modulation scheme. For example, when using a binary phase shift keying (BPSK) (i.e., a PUCCH format 1a), 1-bit uplink control information can be transmitted on the PUCCH, and when using quadrature phase shift keying (QPSK) (i.e., a PUCCH format 1b), 2-bit uplink control information can be transmitted on the PUCCH. In addition thereto, examples of the PUCCH format include a format 1, a format 2, a format 2a, a format 2b, etc. For this, the section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)" can be incorporated herein by reference.

A wireless communication system, for example, the wireless communication system described with reference to FIG. 1, may be a system using a multi-input multi-output (MIMO) technique, that is, may be a MIMO system. Being evolved from the conventional technique in which a single transmit (Tx) antenna and a single receive (Rx) antenna are used, the MIMO technique uses multiple Tx antennas and multiple Rx antennas to improve transfer efficiency of data to be transmitted or received. In other words, the MIMO technique is a technique of using a plurality of antennas in a transmitter or a receiver of the wireless communication system. Performance and communication capacity of the wireless communication system can be improved by using the MIMO technique. The MIMO system is also referred to as a multi-antenna system. In the MIMO technique, instead of receiving one whole message through a single antenna path, data segments are received through a plurality of antennas and are then collected as one piece of data. As a result, a data transfer rate can be improved in a specific range, or a system range can be increased with respect to a specific data transfer rate.

A next-generation mobile communication technique requires a data transfer rate higher than that used in the conventional mobile communication technique. Therefore, a MIMO technique is essential to the next-generation mobile communication technique. The MIMO technique can be applied not only to an eNB but also to a UE or an RN, and thus can be used to overcome a limitation of a data transfer rate. In addition, the MIMO technique is drawing attention more than various other techniques due to a technical advantage in that data transmission efficiency can be improved without having to use an additional frequency band or without having to require additional transmission power.

First, mathematical modeling of a MIMO system will be described.

Figure 7:
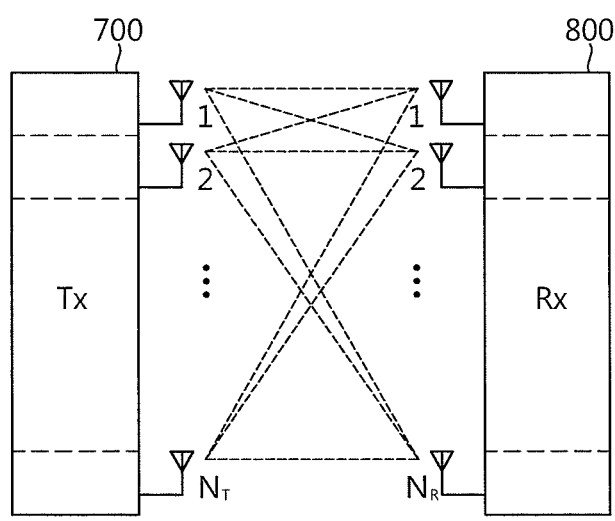
FIG. 7 shows a multi-input multi-output (MIMO) system.

FIG. 7 shows a MIMO system.

Referring to FIG. 7, a transmitter 700 has $N_T$ Tx antennas, and a receiver 800 has $N_R$ Rx antennas. In this case, ideal channel transmission capacity is increased in proportion to the number of antennas.

In theory, a data transfer rate obtained by the increase in channel transmission capacity can be expressed by the product between a maximum data rate $R_O$ obtained when using a single antenna and an increment rate $R_i$ generated when using multiple antennas. The increment rate $R_i$ can be expressed by Equation 1 below.

$$R_i = \min(N_T, N_R) \quad \text{[Equation 1]}$$

If $N_T$ denotes the number of Tx antennas, transmission information may consist of up to $N_T$ different pieces of information. In this case, the transmission information can be expressed by Equation 2 below.

$$s = [s_1, s_2, \ldots, s_{N_T}]^T \quad \text{[Equation 2]}$$

In Equation 2, s denotes a transmission information vector, and s1, s2, ..., sNT denote information indicating each element of the transmission information vector. Each information can be transmitted with different transmission power. When each transmission power is denoted by (P1, P2, ..., PNT), the transmission information vector to which the transmission power is allocated can be expressed by Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Equation 3 can be expressed by the product between a transmission power diagonal matrix and a transmission information vector as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

A transmission information vector to which transmission power is applied is multiplied by a weight matrix W to generate Tx signals $x_1, x_2, \ldots, x_{N_T}$ transmitted in practice through $N_T$ Tx antennas. The weight matrix W takes a role of properly distributing transmission information to an individual antenna according to a transmission channel condition. If a Tx signal vector is denoted by x, it can be expressed by Equation 5 below.

$$x = \begin{bmatrix} x_1 \\ x_2 \\ \vdots \\ x_i \\ \vdots \\ x_{N_T} \end{bmatrix}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

In Equation 5, elements $w_{ij}$ ($1 \leq i \leq N_T$, $1 \leq j \leq N_T$) of the weight matrix denote a weight for an $i^{th}$ Tx antenna and $j^{th}$ transmission information. The weight matrix W is also referred to as a precoding matrix.

The Tx signal vector can include different transmission information according to a transmission scheme. For example, when applying spatial diversity, i.e., transmission diversity, all elements of the Tx signal vector may have the same transmission information. That is, $[s_1, s_2, \ldots, s_{nT}]$ may be the same information, for example, $[s_i, s_1, \ldots, s_1]$. Therefore, since the same transmission information is delivered to a receiver through a different channel, a diversity effect occurs, and transmission reliability increases.

Alternatively, when applying the spatial multiplexing, all elements of the transmission information of the Tx signal vector may be different from one another. That is, $s_1, s_2, \ldots s_{nT}$ may be different information. Since different transmission information is delivered to the receiver through a different channel, advantageously, there is an increase in an amount of information that can be transmitted.

Of course, the transmission information can be delivered by using spatial multiplexing together with the spatial diversity. That is, in the above example, the same information is transmitted by using the spatial diversity through three Tx antennas, and different information can be transmitted by using the spatial multiplexing through the remaining Tx antennas. In this case, the transmission information vector can be configured such as $[s_1, s_1, s_1, s_2, s_3 \ldots s_{nT-2}]$.

If $N_R$ denotes the number of Rx antennas in the receiver, a signal received in an individual Rx antenna can be denoted by $y_n(1 \leq n \leq N_R)$. In this case, an Rx signal vector y can be expressed by Equation 6 below.

$$y = [y_1, y_2, \ldots, y_{N_R}]^T \quad \text{[Equation 6]}$$

When performing channel modeling in the MIMO system, each channel can be identified by using an index of a Tx antenna and an index of an Rx antenna. If the index of the Tx antenna is denoted by j and the index of the Rx antenna is denoted by i, a channel between the Tx antenna and the Rx antenna can be denoted by $h_{ij}$ (herein, it should be noted that the index of the Rx antenna is first indicated in a subscript indicating the channel and the index of the Tx antenna is indicated later).

Figure 8:
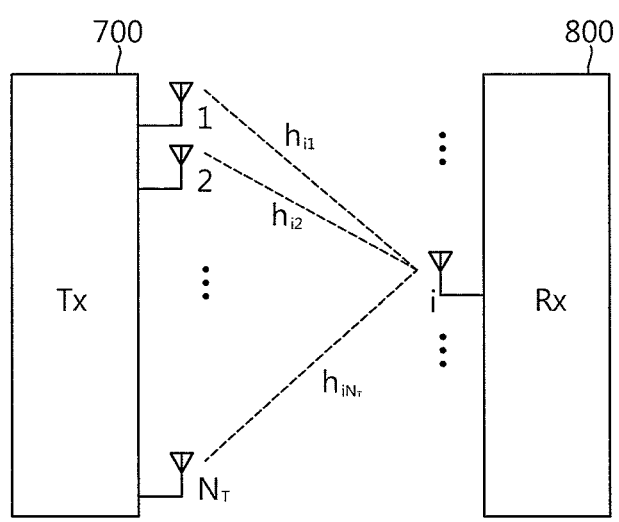
FIG. 8 shows an example of indicating a channel in a multi-antenna system.

FIG. 8 shows an example of indicating a channel in a multi-antenna system.

Referring to FIG. 8, channels for respective $N_T$ Tx antennas with respect to an Rx antenna i are denoted by $h_{i1}, h_{i2}, \ldots, h_{iN_T}$. For convenience of explanation, the channels can be expressed as a matrix or a vector. Then, the channels $h_{i1}, h_{i2}, \ldots, h_{iN_T}$ can be expressed in a vector form as shown in Equation 7 below.

$$h_i^T = [h_{i1}, h_{i2}, \ldots, h_{iN_T}] \quad \text{[Equation 7]}$$

If all channels from $N_T$ Tx antennas to $N_R$ Rx antennas are expressed in a matrix form as a channel matrix H, the channel matrix H can be expressed by Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

A signal transmitted through a Tx antenna is transmitted through a channel expressed by Equation 8 above and is received in an Rx antenna. In this case, noise is added in an actual channel. Mathematically, the noise can be regarded as an additive white Gaussian noise (AWGN). If AWGNs added to respective Rx antennas are denoted by $n_1, n_2, \ldots, n_{N_R}$, for convenience of explanation, these AWGNs can be expressed as a vector of Equation 9 below.

$$n = [n_1, n_2, \ldots, n_{N_R}]^T \quad \text{[Equation 9]}$$

An Rx signal vector y received in an Rx antenna can be expressed by Equation 10 below by considering the aforementioned AWGN, the Tx signal vector x, a channel matrix, etc.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the channel matrix H, the number of rows and the number of columns are determined according to the number of Tx antennas and the number of Rx antennas. In the channel matrix H, the number of rows is equal to the number of Rx antennas. Further, in the channel matrix H, the number of columns is equal to the number of Tx antennas. Therefore, the channel matrix H can be expressed by an $N_R \times N_T$ matrix.

In general, a matrix rank is defined by a smaller value between the number of independent rows and the number of independent columns. Therefore, the matrix rank cannot be greater than the number of columns or the number of rows, and a rank of the channel matrix H is determined by Equation 11 below.

$$\text{rank}(H) \leq \min(N_T, N_R) \quad \text{[Equation 11]}$$

In general, transmission information (e.g., data) is easily distorted and modified while it is transmitted through a radio channel. Therefore, a reference signal (RS) is necessary to demodulate the transmission information in an error-free manner. The RS is a signal pre-known between the transmitter and the receiver and is transmitted together with the transmission information. Since the transmission information transmitted from the transmitter experiences a corresponding channel for each Tx antenna or for each layer, the RS can be allocated for each Tx antenna or for each layer. The RS for each Tx antenna or for each layer can be identified by using a resource (e.g., time, frequency, code, etc.). The RS can be used for two purposes, i.e., transmission information demodulation and channel estimation.

The RS can be classified into two types according to a range of a receiver which knows the RS in advance. A first type of the RS is known to only a specific receiver (e.g., a specific UE), and is called a dedicated RS (DRS). In this sense, the DRS is also called a UE-specific RS. A second type of the RS is known to all receivers in a cell, e.g., all UEs, and is called a common RS (CRS). The CRS is also called a cell-specific RS.

In addition, the RS can be classified according to a usage. For example, an RS used for data demodulation is called a demodulation RS (DM-RS). An RS used for feedback information indicating a channel state (e.g., CQI/PMI/RI) is called a channel state indicator-RS (CSI-RS). The aforementioned DRS can be used as a DM-RS. Hereinafter, it is premised that the DM-RS is a DRS.

Figure 9:
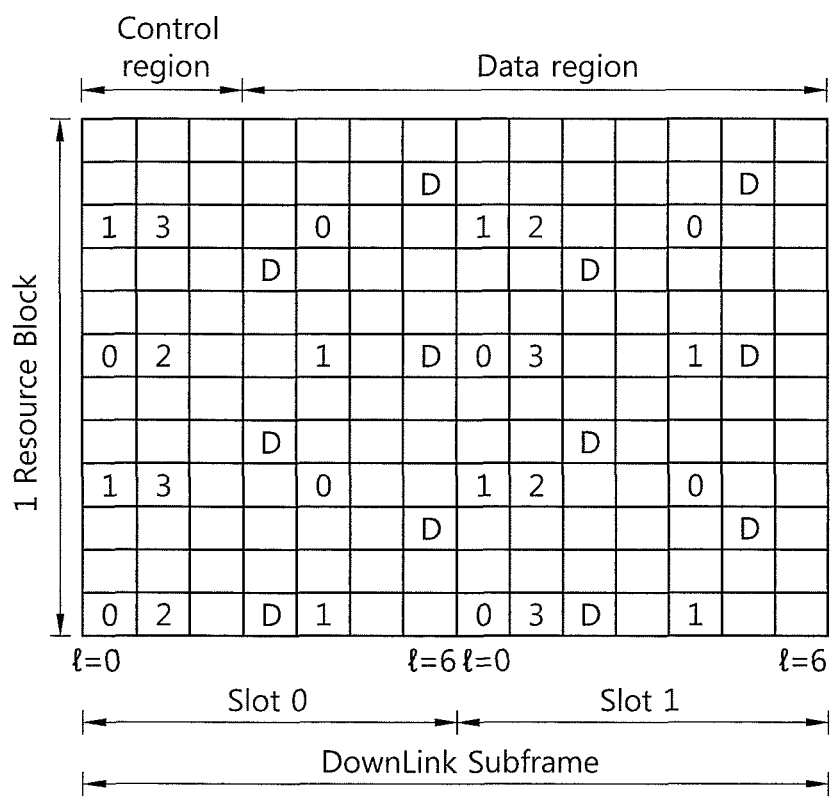
FIG. 9 shows an example of a reference signal (RS) structure capable of supporting four antenna ports in case of using a normal cyclic prefix (CP).
Figure 10:
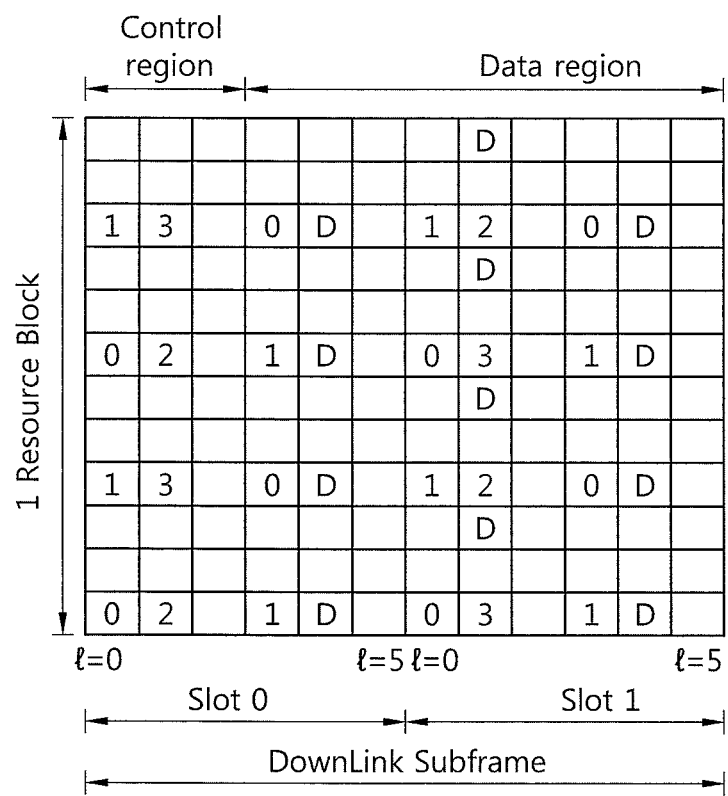
FIG. 10 shows an example of an RS structure capable of supporting four antenna ports in case of using an extended CP.

FIG. 9 shows an example of an RS structure capable of supporting four antenna ports in case of using a normal CP. FIG. 10 shows an example of an RS structure capable of supporting four antenna ports in case of using an extended CP. The RS structures of FIG. 9 and FIG. 10 are RS structures used in the conventional 3GPP LTE system.

In FIG. 9 and FIG. 10, a resource element indicated by any one of values 0 to 3 indicates a resource element for transmitting a cell-specific RS (CRS). In this case, any one value in the range of 0 to 3 indicates a supported antenna port. That is, resource elements marked with p (where p is any one of values 0 to 3) are resource elements to which a CRS for an antenna port p is mapped. The CRS is used for channel measurement and data demodulation for each antenna port. The CRS is transmitted in both a control region and a data region of a subframe.

In FIG. 9 and FIG. 10, a resource element marked with 'D' indicates a resource element to which a UE-specific RS (i.e., a DRS) is mapped. The UE-specific RS can be used in single-antenna port transmission of a PDSCH. A UE receives an indication on whether the UE-specific RS is transmitted through a high-layer signal, and if the PDSCH is transmitted, whether the UE-specific RS is valid. The UE-specific RS can be transmitted only when data demodulation is necessary. The UE-specific RS can be transmitted only in a data region of a subframe.

Now, a subframe structure that can be applied to a backhaul downlink between an eNB and an RN will be described, and then a reference signal that can be used in the backhaul downlink will be described.

First, terminologies will be described for convenience of explanation. Hereinafter, an R-PDCCH is a physical control channel for transmitting control information by the eNB to the RN, and an R-PDSCH is a physical data channel for transmitting data by the eNB to the RN. Hereinafter, an 'x' region is a radio resource region for transmitting 'x'. For example, an R-PDCCH region is a radio resource region for transmitting the R-PDCCH by the eNB.

Figure 11:
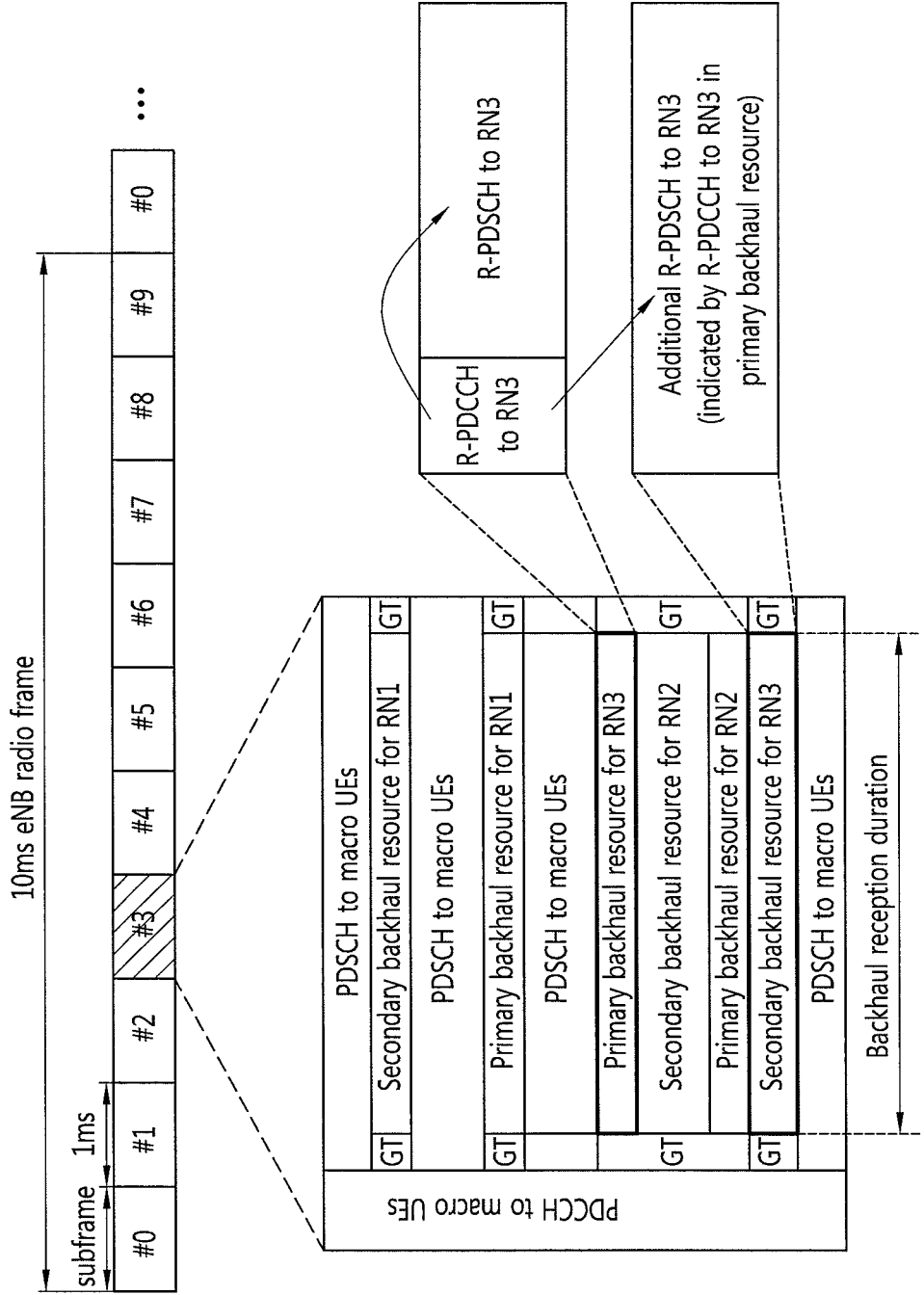
FIG. 11 shows an example of a subframe structure that can be used in a backhaul downlink between an eNodeB (eNB) and an RN.

FIG. 11 shows an example of a subframe structure that can be used in a backhaul downlink between an eNB and an RN.

Referring to FIG. 11, the eNB transmits a PDCCH (also can be referred to as a macro PDCCH) to a macro UE (Ma-UE) in a specific number of first OFDM symbols of a subframe. In the specific number of first OFDM symbols, the RN can transmit the PDCCH to an RN-UE. The RN cannot receive a backhaul signal from the eNB due to self-interference in an OFDM symbol duration in which the PDCCH is transmitted to the RN-UE.

The eNB transmits a backhaul signal to the RN after a guard time (GT) elapses. The GT is a stabilization period depending on signal transmission/reception switching of the RN. In FIG. 11, a case where the GT corresponds to one OFDM symbol is exemplified. However, the GT may be equal to or less than one OFDM symbol duration, and optionally may be equal to or greater than one OFDM symbol. In addition, the GT can be set to a duration of an OFDM symbol unit in a time domain, and can be set to a sampling time unit. Although the GT is located in both front and rear parts of a backhaul reception duration in FIG. 11, the present invention is not limited thereto. That is, the GT located in the rear part of the backhaul reception duration in the time domain may not be set according to a timing alignment relation of the subframe. In this case, the backhaul reception duration can be extended up to a last OFDM symbol of the subframe. The GT can be defined only for a frequency band configured to transmit a signal by the eNB to the RN.

The eNB can allocate the backhaul downlink resource to be allocated to the RN by classifying the backhaul downlink resource into two types.

One type is a primary backhaul region and is a resource region in which an R-PDCCH and an R-PDSCH can be transmitted. In the primary backhaul region, the R-PDCCH and the R-PDSCH can be multiplexed using time division multiplexing (TDM). That is, the R-PDCCH and the R-PDSCH can be transmitted by being divided in a time domain, and the R-PDSCH can be located after the R-PDCCH. The R-PDCCH included in the primary backhaul region can include resource allocation information regarding not only the R-PDSCH of a frequency band at which the R-PDCCH is transmitted but also regarding the R-PDSCH located at another frequency band. In addition, although it is shown in FIG. 11 that the R-PDSCH is also transmitted in the primary backhaul region, the present invention is not limited thereto. That is, only the R-PDCCH can be transmitted without having to transmit the R-PDSCH in all OFDM symbols of the primary backhaul region.

The other type is a secondary backhaul region. Only the R-PDSCH is transmitted in the secondary backhaul region, and can be indicated by the R-PDCCH included in the primary backhaul region as described above.

The backhaul signal transmitted in the primary backhaul region and the secondary backhaul region can be transmitted by being multiplexed with a PDSCH transmitted to a Ma-UE in a frequency domain.

Which reference signal will be used in the R-PDCCH and the R-PDSCH of the backhaul downlink subframe needs to be taken into consideration.

The present invention proposes to use a DM-RS (DRS) for both transmission (from the perspective of the eNB)/reception (from the perspective of the RN) of the R-PDCCH and the R-PDSCH. This method is advantageous when applying improved multi-user (MU) MIMO (e.g., zero-forcing MU-MIMO) to a region in which a backhaul signal is transmitted. In other words, since the DM-RS is applied to the entire backhaul signal (including both the R-PDCCH and the R-PDSCH) transmitted by the eNB, the R-PDCCH and the R-PDSCH can be spatially multiplexed with another backhaul signal, and can also be spatially multiplexed with the PDSCH transmitted to a Ma-UE.

Hereinafter, a method of signaling between an eNB and an RN and a method of operating the RN will be described when the DM-RS is used in both an R-PDCCH and an R-PDSCH.

1. Signaling Between eNB and RN

Figure 12:
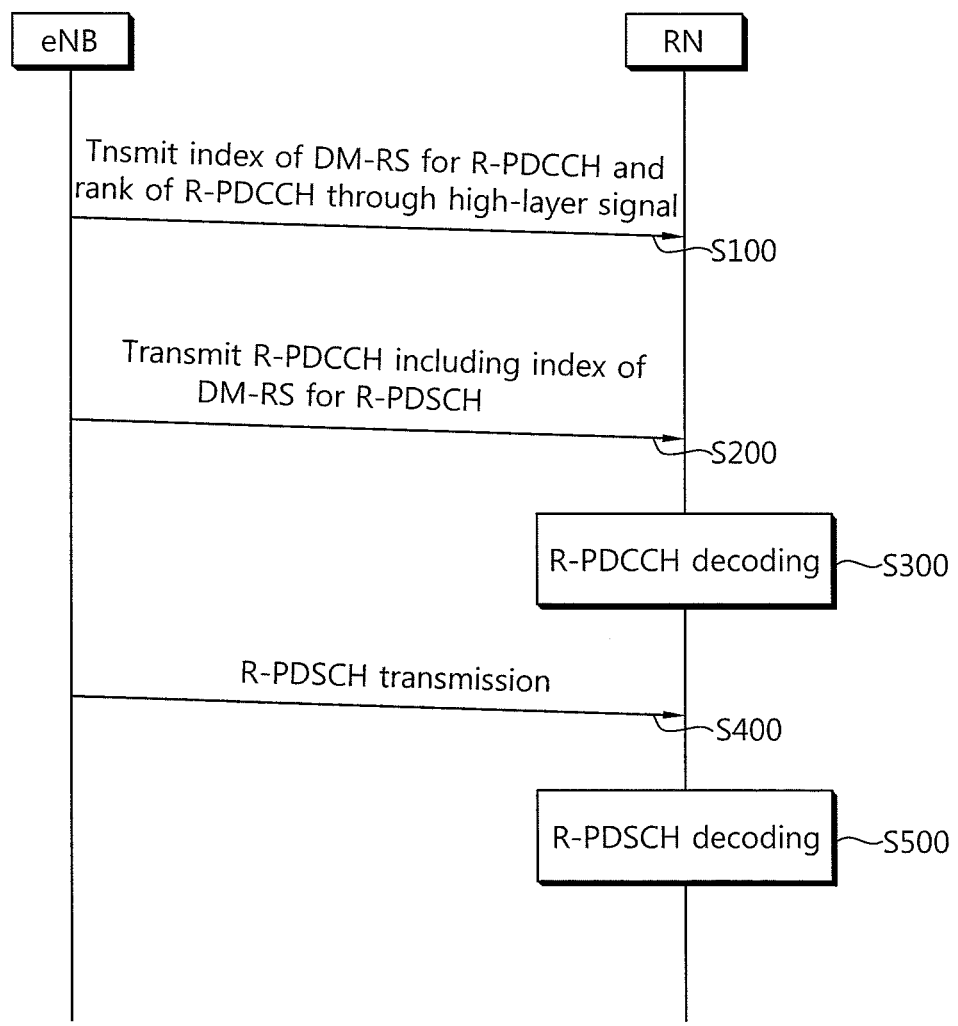
FIG. 12 shows a signaling process between an eNB and an RN when a demodulation RS (DM-RS) is used in both an R-PDCCH and an R-PDSCH.

FIG. 12 shows a signaling process between an eNB and an RN when a DM-RS is used in both an R-PDCCH and an R-PDSCH.

Referring to FIG. 12, the eNB can report an index of the DM-RS used in the R-PDCCH through a high-layer signal (e.g., a radio resource control (RRC) message) (step S100). Herein, the index of the DM-RS collectively refers to information capable of identifying the DM-RS. Examples of the index of the DM-RS include information on an antenna port for transmitting the DM-RS of the R-PDCCH for each RN, information on a scramble identifier (ID) applied to an antenna port 0 for transmitting the DM-RS of the R-PDCCH for each RN, or a combination of the aforementioned scramble ID and the antenna port for transmitting the DM-RS of the R-PDCCH. The scramble ID of the antenna port for transmitting the DM-RS must be different from the scramble ID of the DM-RS antenna port that can be used for scheduling of different multi-user MIMO resources in a space domain.

A UE performs macro PDCCH decoding by using a CRS, and thus can know an index of a DM-RS used for decoding of a macro PDSCH. However, an RN may not be able to decode the macro PDCCH transmitted by an eNB. This is because the RN may transmit the PDCCH to an RN-UE during the eNB transmits the macro PDCCH. That is, since the RN cannot receive the macro PDCCH from the eNB during the PDCCH is transmitted to the RN-UE, the RN cannot decode the macro PDCCH. Therefore, the eNB must report the index of the DM-RS used in the R-PDCCH to the RN through the high-layer signal.

By considering a fact that the R-PDCCH must be transmitted with high reliability even though it includes a limited number of bits, a transmission rank of the R-PDCCH can be limited to a specific value. For example, the transmission rank of the R-PDCCH can be limited to 1. That is, the eNB may not use spatial multiplexing in the R-PDCCH transmitted to the RN.

Alternatively, the eNB may use spatial multiplexing in R-PDCCH transmission. The eNB can transmit a transmission rank value of the R-PDCCH to the RN through the high-layer signal (e.g., an RRC message) in order to avoid a situation where the RN has to perform blind decoding or has to perform blind detection on the transmission rank of the R-PDCCH. When the transmission rank value of the R-PDCCH is given, the RN can recognize a location and the total number of resource elements to which a DM-RS is allocated in an R-PDCCH region.

Although FIG. 12 shows an example in which the eNB transmits the index of the DM-RS for the R-PDCCH and/or the transmission rank value of the R-PDCCH through the high-layer signal, in order to decrease signaling overhead, the DM-RS index or the transmission rank value of the R-PDCCH can be pre-set to a specific value.

The eNB can report the index of the DM-RS used in the R-PDSCH through control information included in the R-PDCCH (step S200). In this case, an amount of the control information included in the R-PDCCH can be decreased by determining a specific relation between a DM-RS set used in the R-PDCCH and a DM-RS set used in the R-PDSCH.

For example, regarding a primary backhaul region, the DM-RS used in the R-PDCCH can be equally used for the R-PDSCH. In other words, regarding the R-PDCCH and R-PDSCH included in the primary backhaul region, it can be determined such that the DM-RS used in the R-PDCCH is always used in the R-PDSCH. That is, a DM-RS set used in the R-PDCCH can be expressed as a subset of the DM-RS set used in the R-PDSCH.

A relation determined as described above can equally apply to a secondary backhaul region. That is, the DM-RS set used in the R-PDCCH included in the primary backhaul region is a subset of the DM-RS set used in the R-PDSCH included in the secondary backhaul region. In other words, the DM-RS used in the R-PDCCH included in the primary backhaul region is always used in the R-PDSCH included in the secondary backhaul region.

When the DM-RS set used in the R-PDSCH is determined as described above, a control information signaling overhead for reporting the DM-RS set used in the R-PDSCH can be decreased. This is because one DM-RS index used in the R-PDSCH (i.e., the DM-RS index used in the R-PDCCH) is known to the eNB and the RN through a high-layer signal, and thus the DM-RS index can be omitted from the control information of the R-PDCCH.

In addition, the DM-RS provides a beamforming gain in comparison with a CRS/CSI-RS. For example, when a bitmap is used to indicate the DM-RS index for the R-PDSCH, the DM-RS index used in the R-PDCCH can be excluded from the bitmap. This is because it is known to the RN that the DM-RS used in the R-PDCCH is used as the DM-RS of the R-PDSCH as described above.

For another example, if a DM-RS set in which DM-RS indices are contiguous is used in R-PDSCH transmission, it is enough to report a transmission rank value of the R-PDSCH through the R-PDCCH. That is, if n denotes an index of the DM-RS used in the R-PDCCH, DM-RS indices used for the R-PDSCH may be n, n+1, . . . , n+k−1, where k denotes the transmission rank value of the R-PDSCH.

Figure 13:
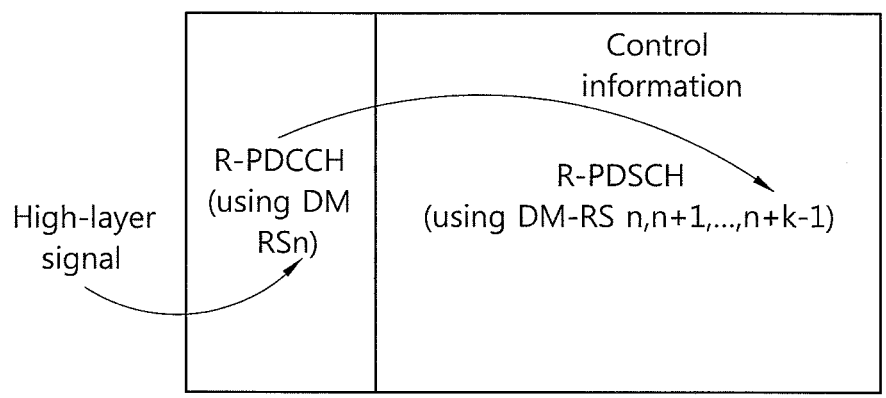
FIG. 13 shows a relation between a DM-RS index of an R-PDCCH and a DM-RS index of an R-PDSCH when a DM-RS set in which DM-RS indices are contiguous is used in R-PDSCH transmission.

FIG. 13 shows a relation between a DM-RS index of an R-PDCCH and a DM-RS index of an R-PDSCH when a DM-RS set in which DM-RS indices are contiguous is used in R-PDSCH transmission.

If the DM-RS index value n of the DM-RS used in the R-PDCCH is reported through a high-layer signal and a transmission rank value k of the R-PDSCH is reported through control information of the R-PDCCH, the DM-RS of the R-PDSCH can have values of the DM-RS indices n, n+1, . . . , n+k−1.

Referring back to FIG. 12, the RN decodes the R-PDCCH (step S300). By decoding the R-PDCCH, the RN can know a correct set of DM-RS used in the R-PDSCH. Further, the eNB transmits the R-PDSCH (step S400), and the RN receives and decodes the R-PDSCH (step S500). Although it is shown in FIG. 12 that the RN decodes the R-PDCCH and then the eNB transmits the R-PDSCH, this is for exemplary purposes only, and thus the present invention is not limited thereto. That is, the RN may receive both the R-PDCCH and the R-PDSCH and then decode the R-PDCCH and the R-PDSCH in that order, or R-PDCCH decoding and R-PDSCH reception may be performed simultaneously.

2. Resource Element Mapping Used in R-PDCCH and R-PDSCH

Hereinafter, a method in which an eNB determines a resource element used in an R-PDCCH and an R-PDSCH will be described.

Figure 14:
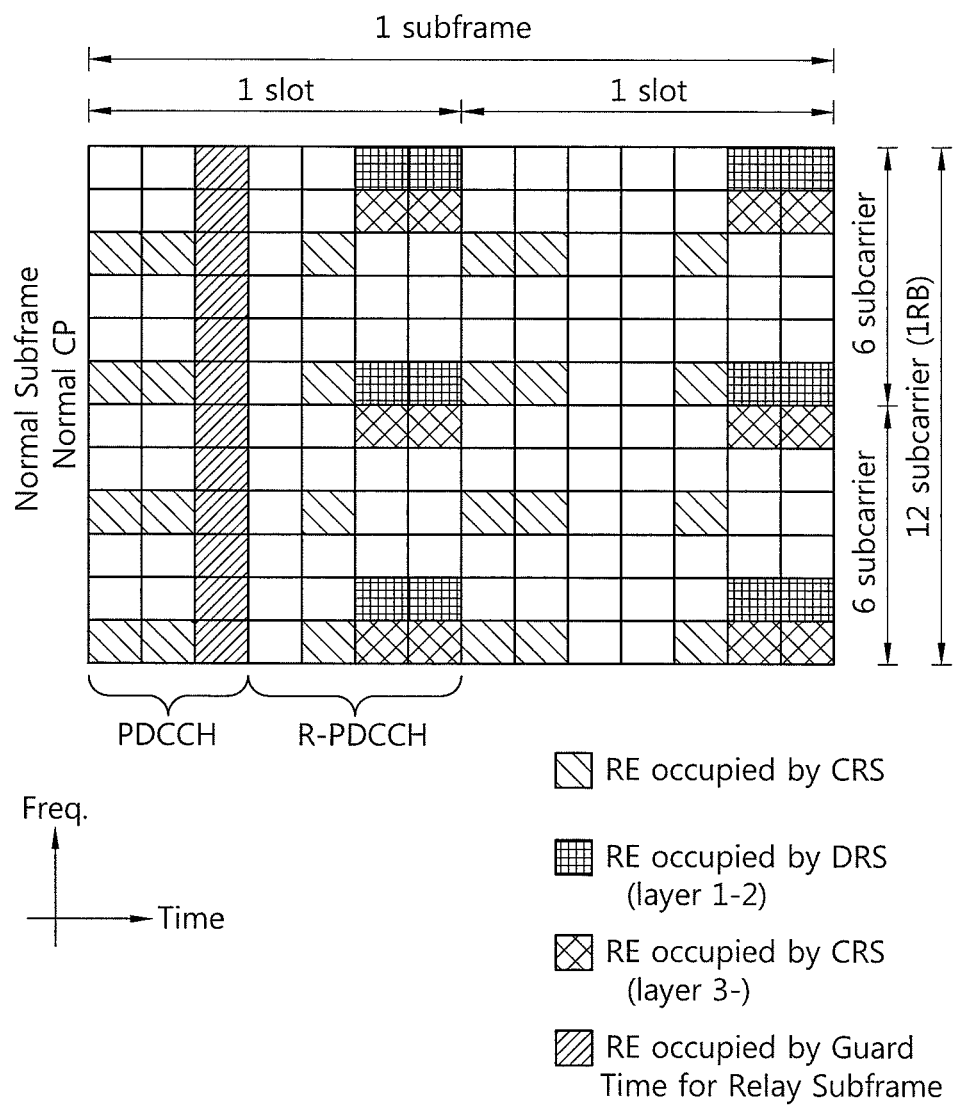
FIG. 14 shows an example of a reference signal resource element that can be allocated within a backhaul downlink subframe in a normal CP.

FIG. 14 shows an example of a reference signal resource element that can be allocated within a backhaul downlink subframe in a normal CP.

Referring to FIG. 14, the reference signal resource element is allocated in a specific pattern to a region including one subframe in a time domain and including 12 subcarriers in a frequency domain (for convenience of explanation, such a region is called a basic unit region). For example, in each slot, a reference signal resource element for a CRS can be allocated with a spacing of three subcarriers to $1^{st}$, $2^{nd}$, $5^{th}$ OFDM symbols (if OFDM symbols in a slot are indexed sequentially from 0, it can be expressed by an OFDM symbol #0, an OFDM symbol #1, and an OFDM symbol #4). A reference signal resource element for a DM-RS (DRS) (hereinafter, a DM-RS resource element) can be allocated to $6^{th}$ and $7^{th}$ OFDM symbols in each slot.

In case of the DM-RS (DRS), for transmission of up to a rank 2, 12 resource elements are used in the basic unit region, and for transmission of a rank 3 or a higher rank, 12 resource elements are additional used in the basis unit region in addition to the 12 resource elements for transmission of up to the rank 2, and thus 24 resource elements are used in total (of course, the number of resource elements used depending on the rank is for exemplary purposes only, and thus the number of resource elements may vary). That is, the number of the DM-RS resource elements and a pattern thereof are determined according to a transmission rank of an R-PDSCH.

A conventional RN can know the transmission rank of the R-PDSCH only after decoding an R-PDCCH. That is, the RN cannot know the transmission rank of the R-PDSCH before decoding the R-PDCCH. However, there is a problem in that the RN uses the DM-RS to decode the R-PDCCH, and the DM-RS resource element can vary depending on the transmission rank of the R-PDSCH.

For example, when four OFDM symbols (from a $4^{th}$ OFDM symbol to a $7^{th}$ OFDM symbol of a $1^{st}$ slot) are used as the R-PDCCH as shown in FIG. 14, the RN cannot know whether the number of DM-RS resource elements in the basic unit region is 12 or 24, and cannot know the DM-RS resource element included in the four OFDM symbols. Therefore, the RN has to decode the R-PDCCH through blind decoding. That is, the R-PDCCH is decoded by using a method of performing decoding on all possible resource element combinations in the four OFDM symbols. As a result, an overhead of a receiver of the RN is excessively increased.

In order to solve such a problem, the eNB can restrict an R-PDCCH resource element (i.e., a resource element to which control information of the R-PDCCH is mapped) to a resource element which does not overlap with all resources that can be used in DM-RS transmission (such a resource element is called a DM-RS candidate resource element). That is, the eNB can perform transmission by puncturing all DM-RS candidate resource elements to which the DM-RS can be allocated in the R-PDCCH region and by mapping control information transmitted through the R-PDCCH to the remaining resource elements. Herein, a resource element of all candidate locations to which a CSI-RS can be additionally allocated can also be excluded. In this case, the eNB can report the CSI-RS through system information, and the RN can know in advance about a specific resource element through which the CSI-RS is transmitted. The RN can decode the R-PDCCH under the assumption that the DM-RS resource element has a pattern of the DM-RS candidate resource element, i.e., a pattern depending a maximum transmission rank value of the R-PDSCH.

Any one of two methods described below can be used to implement the aforementioned method in which the eNB restricts the R-PDCCH resource element to a resource element which does not overlap with the DM-RS candidate resource element and the RN decodes the R-PDCCH and the R-PDSCH.

1. Method Assuming Maximum Transmission Rank of all Backhaul Links

For example, assume that an eNB communicates with an RN 1 and an RN 2. In this case, let assume that a maximum transmission rank is 2 in a backhaul downlink between the eNB and the RN 1, and the maximum transmission rank is 8 in a backhaul downlink between the eNB and the RN 2. Then, a maximum transmission rank of all backhaul downlinks is 8.

In this case, by assuming that the maximum transmission rank of the backhaul downlink is 8 for both the RN 1 and the RN 2, the eNB can map R-PDCCH resource elements in the R-PDCCH region. And, when the RN 1 and the RN 2 both decode their R-PDCCHs, it is assumed that the DM-RS resource elements are mapped for a case of a rank 3 or a higher rank and it is assumed that the remaining resource elements other than the DM-RS resource elements in the R-PDCCH region are the R-PDCCH resource elements. In other words, both the RN 1 and the RN 2 decode the R-PDCCH by using resource elements which do not overlap with the DM-RS resource elements in the R-PDCCH region by assuming that a DM-RS is mapped to 24 resource elements in a basic unit region.

For another example, when the eNB communicates with the RN 1 and the RN 2, a maximum transmission rank in a backhaul downlink between the eNB and the RN 1 may be 2, and a maximum transmission rank in a backhaul downlink between the eNB and the RN 2 may also be 2. Herein, the maximum transmission rank of the all backhaul downlinks is 2. In this case, there is no possibility that transmission with a rank 3 or a higher rank is performed in a backhaul downlink between the eNB and all RNs. Therefore, the eNB maps R-PDCCH resource elements to an R-PDCCH region for a case where 12 DM-RS resource elements exist in a basic unit region, and each RN can decode the R-PDCCH by assuming an R-PDCCH region for a case where 12 DM-RS resource elements exist in the basis unit region.

Figure 15:
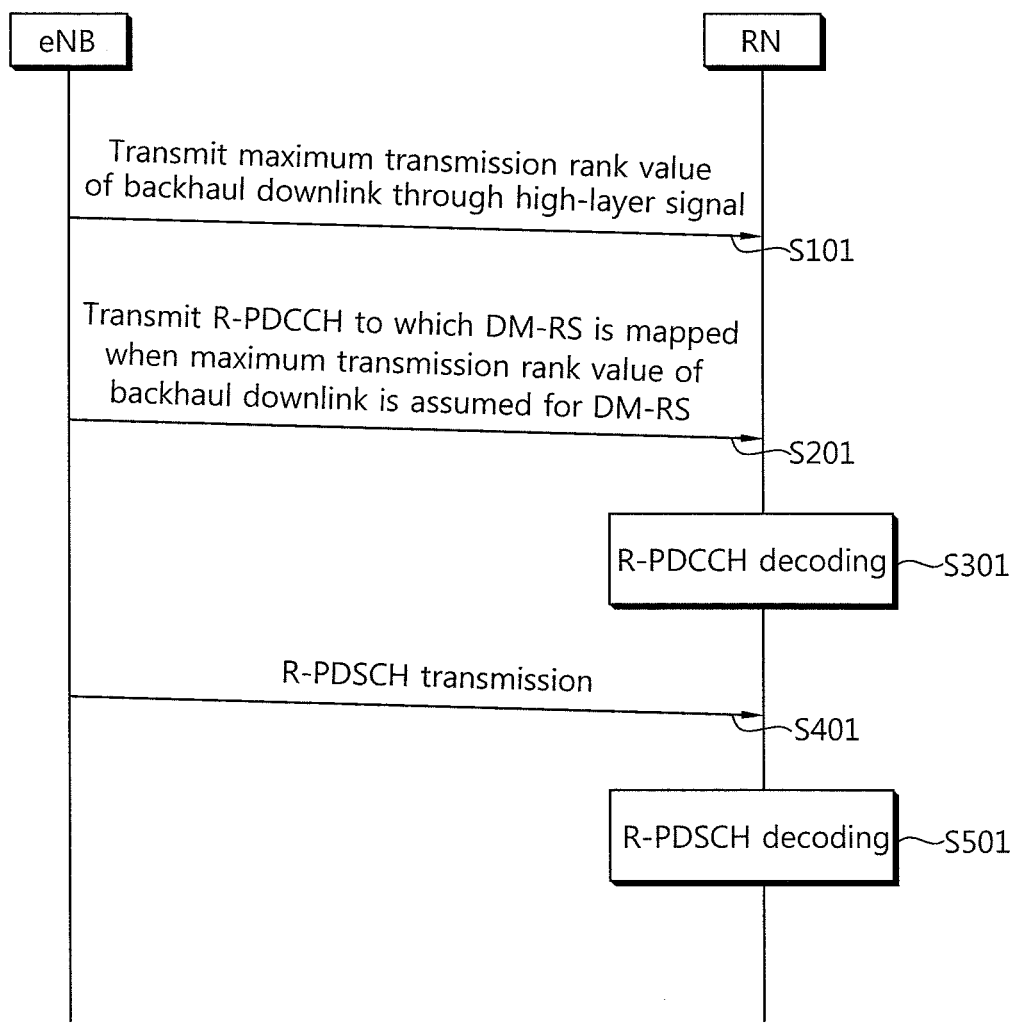
FIG. 15 shows an example of a signaling process between an eNB and an RN when applying a method assuming a maximum transmission rank of a backhaul downlink.

FIG. 15 shows an example of a signaling process between an eNB and an RN when applying the aforementioned method assuming the maximum transmission rank of the backhaul downlink.

The eNB transmits a maximum transmission rank value of all backhaul downlink through a high-layer signal such as an RRC message (step S101). The maximum transmission rank value of the all backhaul downlink is equal to the maximum number of independent streams that can be transmitted in the backhaul downlink. Although not shown in the figure, the eNB can also transmit an index of a DM-RS for an R-PDCCH through the high-layer signal. The maximum transmission rank value for the all backhaul downlink is a transmission rank value used to determine an overhead of a DM-RS for a case of decoding control information received by the RN from the eNB, that is, control information received through the R-PDCCH, and is a value which is assumed by the eNB and the RN.

The eNB transmits to the RN an R-PDCCH to which the DM-RS for which the maximum transmission rank value of the all backhaul downlink is assumed (step S201). The RN decodes R-PDCCH control information by assuming DM-RS mapping for a case where the R-PDSCH region has the maximum transmission rank value of the all backhaul downlink (step S301). The eNB transmits the R-PDSCH to the RN (step S401). The RN decodes the R-PDSCH (step S501). As described above, the R-PDSCH is decoded by using the DM-RS mapped according to an actual transmission rank value.

Although FIG. 15 shows an example in which a data channel for the RN, i.e., an R-PDSCH, is transmitted in the R-PDSCH region, a control channel may be optionally transmitted in the R-PDSCH region. In this case, for convenience of explanation, a control channel transmitted for an RN in the R-PDCCH region can be called a $1^{st}$ R-PDCCH, and a control channel transmitted for an RN in the R-PDSCH region can be called a $2^{nd}$ R-PDCCH. The $1^{st}$ R-PDCCH and the $2^{nd}$ R-PDCCH can include control information for the same RN, and can include information on different RNs. In this case, an actual transmission rank of the $2^{nd}$ R-PDCCH and an overhead of the DM-RS depending on the transmission rank (i.e., a pattern or the number of DM-RSs in a basic unit region) can be assumed to be a pre-defined value (e.g., a transmission rank 1 or an overhead of a DM-RS depending thereon).

2. Method Assuming Maximum Transmission Rank of Backhaul Downlink in RN-Specific Manner An eNB can map R-PDCCH resource elements by assuming a maximum transmission rank for an individual backhaul downlink of each RN reported to each RN through a high-layer signal.

For example, it is assumed that a maximum transmission rank of a backhaul downlink between the eNB and the RN 1 is 2, and a maximum transmission rank of a backhaul downlink between the eNB and the RN 2 is 8.

In this case, by assuming that the maximum transmission rank of the RN 1 is 2, the eNB can map DM-RS resource elements in an R-PDCCH region and can map R-PDCCH control information to resource elements which do not overlap with the DM-RS resource elements. Then, by assuming a case where a DM-RS is mapped to 12 resource elements in a basic unit region, the RN 1 decodes an R-PDCCH by using resource elements which do not overlap with the DM-RS resource elements in the R-PDCCH region.

Under the assumption that the maximum transmission rank of the RN 2 is 8, the eNB can map the DM-RS resource elements to the R-PUCCH region and can map the R-PDCCH control information to the resource elements which do not overlap with the DM-RS resource elements. Then, by assuming a case where a DM-RS is mapped to 24 resource elements in a basic unit region, the RN 2 decodes an R-PDCCH by using resource elements which do not overlap with the DM-RS resource elements in the R-PDCCH region.

Figure 16:
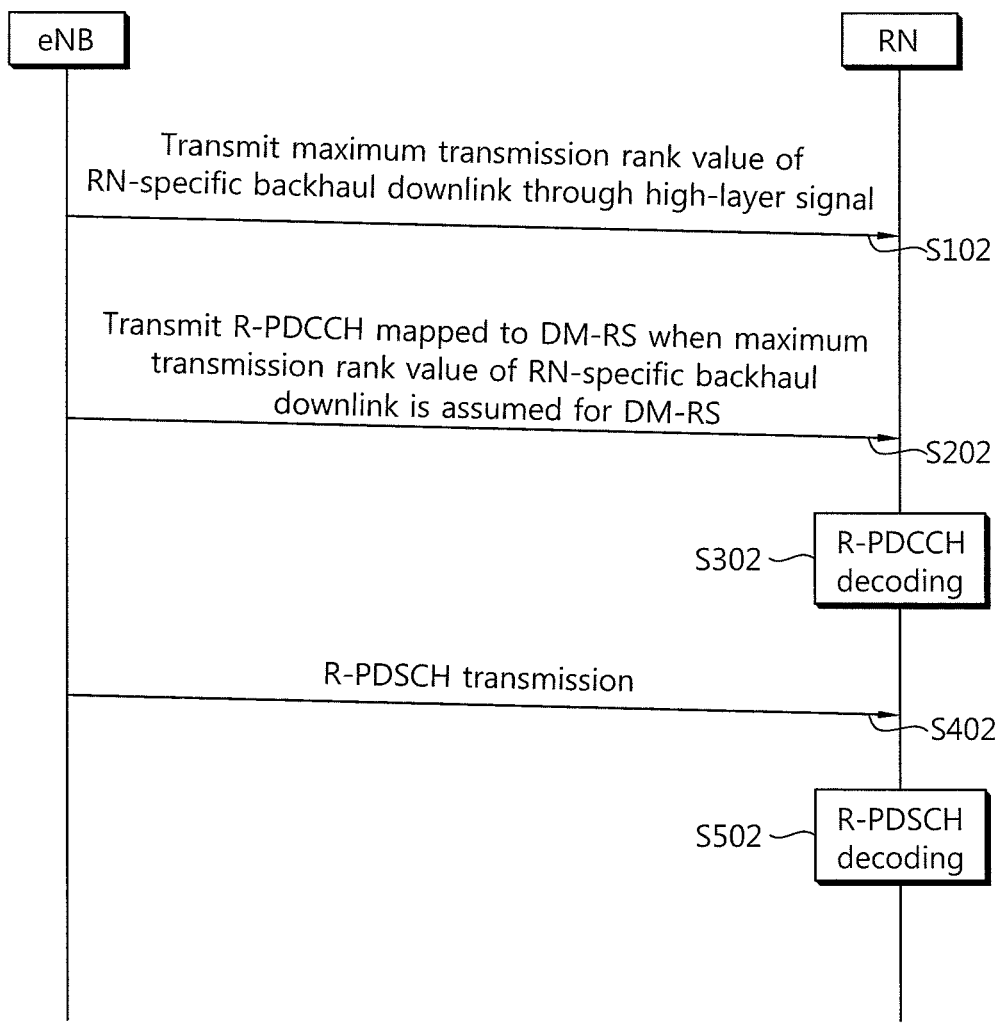
FIG. 16 shows an example of a signaling process between an eNB and an RN when applying a method assuming a maximum transmission rank of a backhaul downlink in an RN-specific manner.

FIG. 16 shows an example of a signaling process between an eNB and an RN when applying the aforementioned method assuming the maximum transmission rank of the backhaul downlink in the RN-specific manner.

The eNB transmits a maximum transmission rank value of an RN-specific backhaul downlink through a high-layer signal such as an RRC message (step S102). The maximum transmission rank value of the RN-specific backhaul downlink is a transmission rank value used to determine an overhead of a DM-RS in a case of decoding control information received by each RN from the eNB, i.e., control information received through the R-PDCCH, and is a value which is assumed by the eNB and the RN. The maximum transmission rank value of the RN-specific backhaul downlink can vary depending on each RN. Although not shown in the figure, the eNB can also transmit an index of a DM-RS for an R-PDCCH through a high-layer signal.

The eNB transmits to the RN an R-PDCCH to which the DM-RS for which the maximum transmission rank value of the RN-specific backhaul downlink is assumed (step S202). The RN decodes R-PDCCH control information by assuming DM-RS mapping for a case where the PDSCH region has the maximum transmission rank value of the RN-specific backhaul downlink (step S302). The eNB transmits the R-PDSCH to the RN (step S402). The RN decodes the R-PDSCH (step S502). Optionally, as described above in '1. Method assuming maximum transmission rank of all backhaul link', a $2^{nd}$ R-PDCCH can be transmitted in the R-PDSCH region, and in this case, an actual transmission rank of the $2^{nd}$ R-PDCCH and a DM-RS overhead depending thereon can be assumed to be a pre-defined value (e.g., a transmission rank 1 and a DM-RS overhead depending thereon).

The RN can know a transmission rank of an R-PDSCH when the RN successfully decodes the R-PDCCH by using any one of the aforementioned methods, i.e., '1. Method assuming maximum transmission rank of all backhaul link' and '2. Method assuming maximum transmission rank of backhaul downlink in RN-specific manner'. Therefore, regarding the R-PDSCH region, the eNB can map the DM-RS resource element according to an actual transmission rank of each RN. That is, regarding the R-PDSCH region, the eNB maps a DM-RS and R-PDSCH data according to the actual transmission rank instead of mapping them by assuming a maximum transmission rank of a backhaul downlink or a maximum transmission rank of an individual backhaul downlink of each RN similarly to the case of the R-PDCCH region. Therefore, in the R-PDSCH region, the R-PDSCH resource element (i.e., a resource element to which data is mapped in the R-PDSCH) can include a resource element which is not used in actual DM-RS transmission among DM-RS candidate resource elements. The RN can decode the R-PDCCH and thus can correctly decode the R-PDSCH according to the actual transmission rank.

Hereinafter, when it is said that the RN assumes the maximum transmission rank of the backhaul link with respect to the R-PDCCH region, it is the concept including the aforementioned methods, i.e., '1. Method assuming maximum transmission rank of all backhaul link' and '2. Method assuming maximum transmission rank of backhaul downlink in RN-specific manner'.

Figure 17:
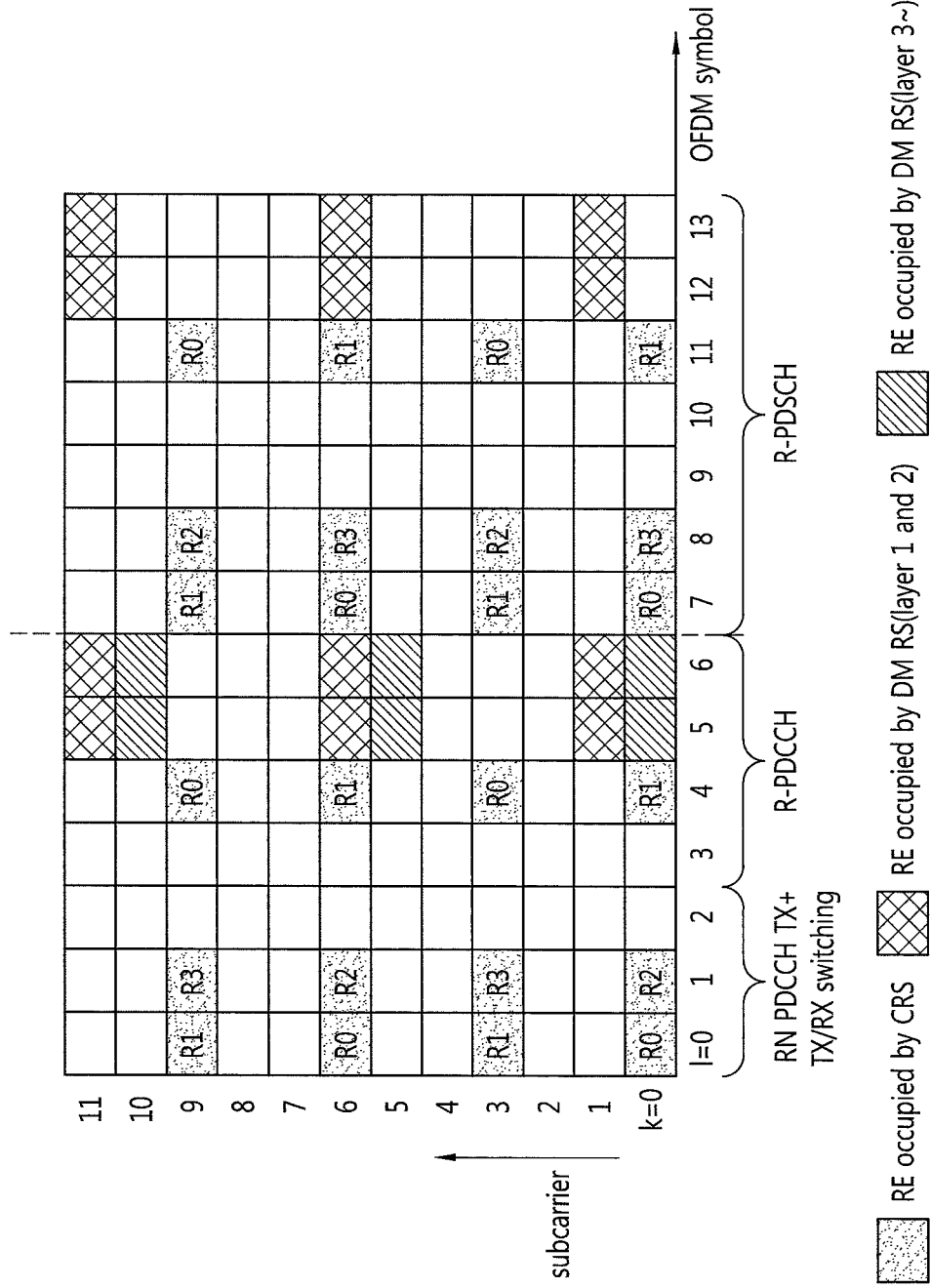
FIG. 17 shows an example of a DM-RS resource element assumed by an RN in an R-PDCCH region of a backhaul downlink subframe.

FIG. 17 shows an example of DM-RS resource elements assumed by an RN in an R-PDCCH region of a backhaul downlink subframe.

Referring to FIG. 17, the RN performs R-PDCCH decoding by assuming DM-RS resource elements arranged when an R-PDSCH is transmitted using a maximum transmission rank value. That is, for the DM-RS resource elements in the R-PDCCH region, DM-RS resource elements arranged when R-PDSCH transmission is performed with a rank 3 or a higher rank are assumed.

After decoding the R-PDCCH, the RN can know actual R-PDSCH transmission rank value. Therefore, it is enough for the RN to decode the R-PDSCH region by considering DM-RS resource elements depending on a rank value of R-PDSCH transmission. In the example of FIG. 17, R-PDSCH transmission is any one of rank-1 transmission or rank-2 transmission.

Figure 18:
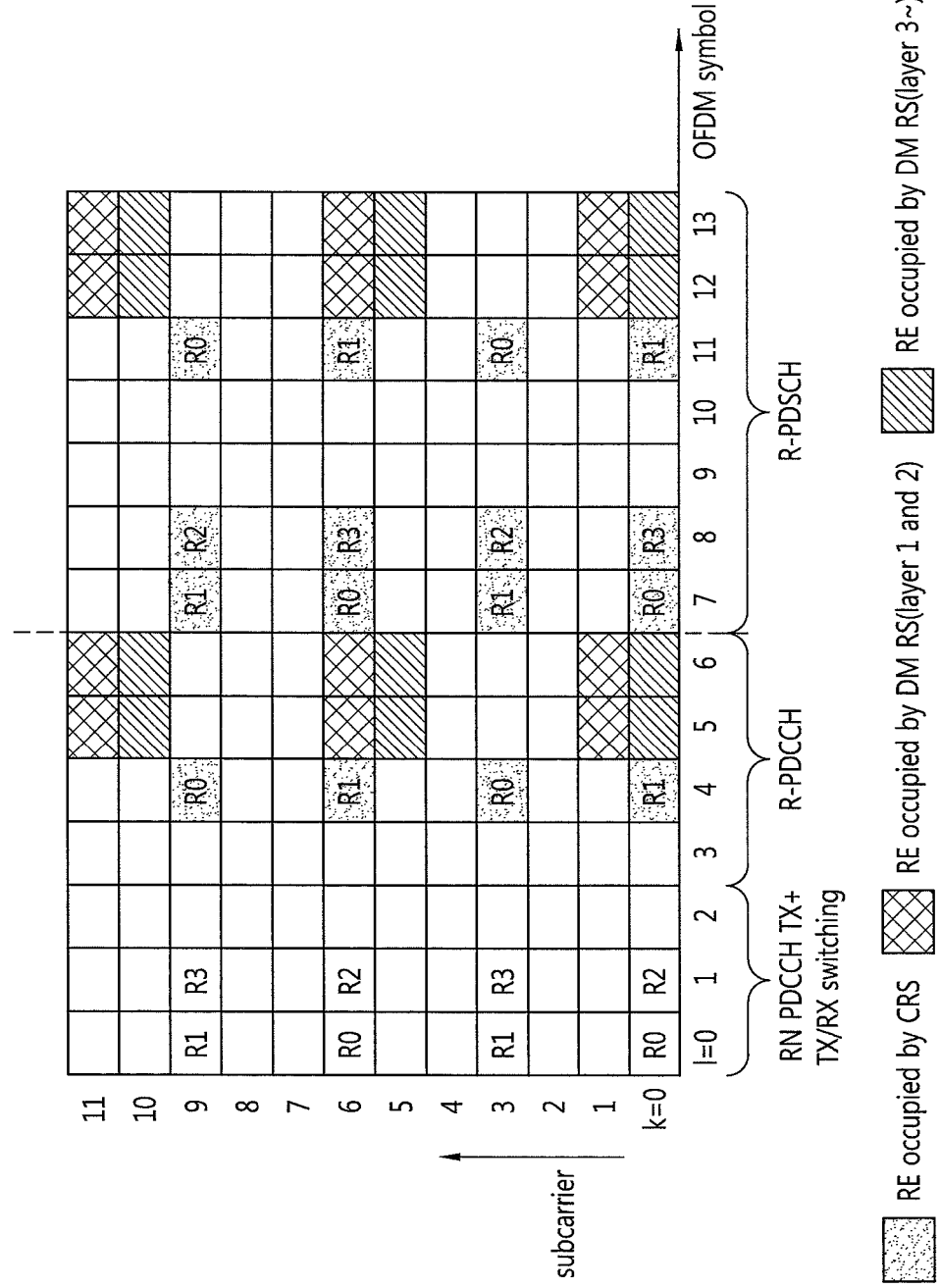
FIG. 18 shows an example of a DM-RS resource element of a backhaul downlink subframe.

FIG. 18 shows an example of a DM-RS resource element of a backhaul downlink subframe.

Referring to FIG. 18, by assuming a DM-RS for a maximum transmission rank value irrespective of an actual R-PDSCH transmission rank value, an eNB can allocate an R-PDCCH and an R-PDSCH to a resource element to which the DM-RS is not allocated. By assuming a DM-RS for a maximum transmission rank value of the R-PDSCH, an RN can perform R-PDCCH and R-PDSCH decoding on a resource element which does not overlap with a resource element to which the DM-RS can be allocated. That is, the eNB can equally maintain a structure of the DM-RS in each slot of a backhaul downlink subframe. In this manner, the increase in complexity can be avoided, and implementation can be achieved more conveniently.

3. Precoding Matrix/Vector Applied to R-PDCCH and R-PDSCH

Figure 19:
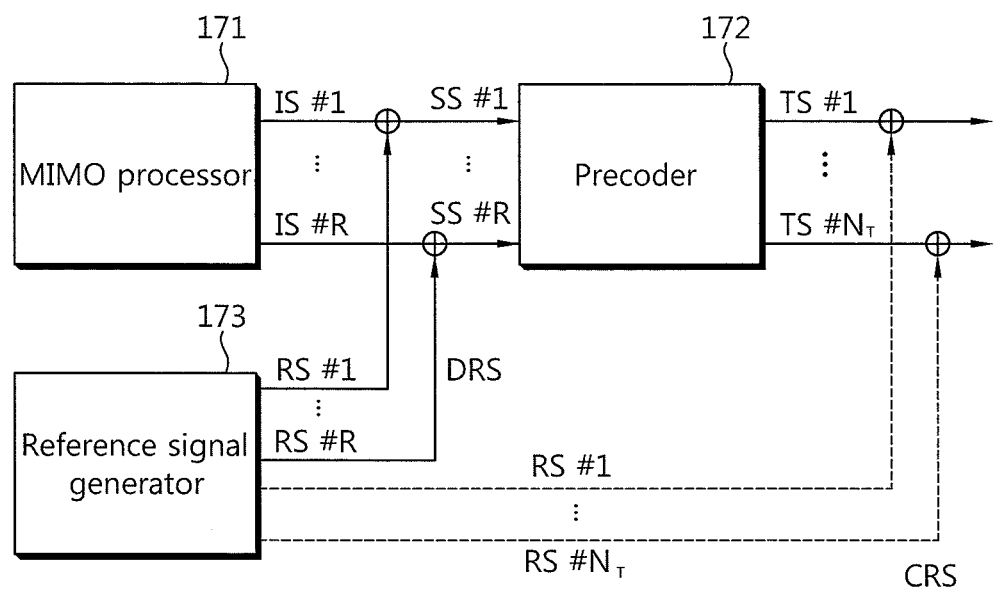
FIG. 19 shows an exemplary structure of a transmitter according to an embodiment of the present invention.

FIG. 19 shows an exemplary structure of a transmitter according to an embodiment of the present invention.

Referring to FIG. 19, the transmitter includes a MIMO processor 171, a precoder 172, and a reference signal generator 173. The transmitter may be a part of an eNB.

The MIMO processor 171 generates control information and data to be transmitted to an RN. The MIMO processor 171 generates R information streams (ISs) IS#1 to IS#R as the control information and data. Herein, R denotes the number of spatial layers.

The precoder 172 receives spatial streams (SSs) from the MIMO processor 171 and generates transmit streams (TSs) TS#1 to TS#$N_T$ by applying a precoding matrix/vector. Herein, $N_T$ is equal to the number of Tx antennas.

The reference signal generator 173 generates a reference signal sequence, and provides the generated reference signal sequence to an input or output of the precoder 172. A DRS used as the aforementioned DM-RS is provided to the input of the precoder 172, is subjected to the precoder 172, and then is output by being included in the TS. That is, the DRS becomes a precoded reference signal. A CRS is added to the output of the precoder 172 and thus is included in the TS.

If the DRS is used for an R-PDCCH and an R-PDSCH, a precoding matrix for the two channels (i.e., R-PDCCH and R-PDSCH) is required to support a precoded reference signal.

In this case, the eNB can configure a precoding matrix/vector for the R-PDCCH as a subset of a precoding matrix/vector used for the R-PDSCH.

For example, a precoding matrix W used in the R-PDSCH can be expressed by Equation 12 below.

$$W = (w_0 \ w_1 \ \ldots \ w_{R-1}) = \begin{pmatrix} w_{01} & w_{11} & \ldots & w_{(R-1)1} \\ w_{02} & w_{12} & \ldots & w_{(R-1)2} \\ \vdots & \vdots & \ddots & \vdots \\ w_{0Nt} & w_{1Nt} & \ldots & w_{(R-1)Nt} \end{pmatrix}$$ [Equation 12]

Herein, $w_i$ indicates an $i^{th}$ column vector of a precoding matrix W (where i=0, . . . , R−1). If a rank of the R-PDSCH is 3, the precoding matrix W can be expressed by $(w_0, w_1, w_2)$. In this case, if a rank of the R-PDCCH is 1, a precoding vector for the R-PDCCH can be selected as any one of column vectors from a rank-3 precoding matrix of the R-PDSCH. That is, any one of $w_0$, $w_1$, and $w_2$ can be selected.

If a transmission rank of the R-PDCCH is given by X, the precoding vector can be selected by using various methods. For example, first X column vectors can be selected from a precoding matrix applied to the R-PDSCH, and last X column vectors can be selected from the precoding matrix. Alternatively, any X column vectors can be selected from the precoding matrix through explicit signaling.

The aforementioned method implies that a precoding vector/matrix used in the R-PDCCH is a subset of a precoding matrix/vector used in the R-PDSCH. In addition, it implies that a Tx antenna port (or layer) of a DRS (i.e., DM-RS) is used in both the R-PDCCH and the R-PDSCH. That is, the R-PDCCH and the R-PDSCH are multiplexed such that resource elements are exclusive in a time/frequency domain (which means that they are allocated to different resource elements), but it is not spatially exclusive.

Meanwhile, another method can be used by considering a fact that DM-RS resource elements are equally arranged to both-side slots at a slot boundary of a subframe and an R-PDCCH resource element to which the R-PDCCH is mapped exists only in a $1^{st}$ slot to avoid decoding delay. That is, a DM-RS resource element of the $1^{st}$ slot is used for R-PDCCH demodulation, and a DM-RS resource element of a $2^{nd}$ slot is used for R-PDSCH demodulation. Then, a different precoding matrix can be applied to the DM-RS according to a channel type, i.e., according to whether a channel is the R-PDCCH or the R-PDSCH. In order to support such a method, an eNB can semi-statically signal an index of a DM-RS used in the R-PDCCH through a high-layer signal, and can signal an index of a DM-RS used in the R-PDSCH in a corresponding R-PDCCH. If a DM-RS resource element of a different slot is used when demodulating the R-PDCCH and the R-PDSCH, there is no overlapping portion in the use of two DM-RSs even if the R-PDCCH and the R-PDSCH are demodulated by using the same DM-RS index. Therefore, a DM-RS resource element for demodulating the R-PDCCH can be known irrespective of a rank of the R-PDSCH. An RN does not have to perform blind decoding to distinguish an R-PDCCH resource element and a DM-RS resource element.

Alternatively, the R-PDCCH can be transmitted by using one dedicated DM-RS Tx antenna port which is not used by the R-PDSCH (when transmit diversity is applied to the R-PDCCH, the R-PDCCH can be transmitted by using two DM-RS Tx antenna ports). In this method, the R-PDCCH and the R-PDSCH are spatially multiplexed in an exclusive manner. In this case, the R-PDCCH can be transmitted by using a cyclic delay diversity (CDD) or transmit diversity scheme, for example, space-time block coding (STBC), space-frequency block coding (SFBC), or a combination of the STBC and the SFBC.

Alternatively, the eNB can transmit a CRS in a subframe in which the R-PDCCH is transmitted. Further, the RN can demodulate the R-PDCCH by using the CRS and can demodulate the R-PDSCH by using a DM-RS. In general, the CRS is transmitted across a full system band and across a full subframe. In an LTE-A subframe (e.g., an MBSFN subframe or a fake MBSFN subframe), the eNB transmits the CRS only in a specific number of first OFDM symbols. Herein, the MBSFN subframe or the fake MBSFN subframe has the same structure as the MBSFN subframe for an multimedia broadcast and multicast service (MBMS), but is not a subframe used for the MBMS. That is, the MBSFN subframe or the fake MBSFN subframe is a subframe for transmitting a backhaul signal by the eNB to the RN, and is a subframe for giving information indicating that it is a subframe not requiring signal reception and measurement to a Ma-UE in a specific number of first OFDM symbols of a subframe and for transmitting a backhaul signal to the RN in subsequent OFDM symbols. In the LTE-A subframe, the RN can assume that the CRS is located only in a resource block in which the R-PDCCH is transmitted (of course, the R-PDSCH can also be included in the resource block), and then can demodulate the R-PDCCH. When the eNB reports the LTE-A subframe to the RN, the R-PDCCH can be demodulated by using the CRS transmitted across the full system band according to the aforementioned method. The R-PDCCH can be transmitted by the eNB by using a transmit diversity scheme such as SFBC, and the RN can perform demodulation by assuming that only the CRS exists in the resource block in which the R-PDCCH is transmitted. Then, the R-PDSCH can be demodulated by using the DM-RS. If a resource used in backhaul transmission is spatially multiplexed with a resource used in transmission with respect to the Ma-UE (i.e., if multi-user MIMO is used between the UE and the RN), the spatially multiplexed UE must receive information indicating that a CRS exists in the subframe for multi-user MIMO transmission.

The eNB can transmit the R-PDCCH through the same antenna port as that through which the CRS is transmitted. On the other hand, the R-PDSCH can be transmitted through the same antenna port as that through which a DM-RS is transmitted. According to such a method, transmission can be performed by using a CRS according to the transmit diversity or spatial multiplexing scheme when the eNB transmits the R-PDCCH. At the same time, the R-PDSCH can be precoded differently from the R-PDCCH or can be subjected to subband precoding.

Optionally, it may be difficult to puncture all resource elements by which a DM-RS can be transmitted in an R-PDCCH region. This is because a reference signal overhead is excessively increased. In this case, only a DM-RS reference signal for a specific layer can be mapped in an OFDM symbol duration in which the R-PDCCH is transmitted. Herein, the specific layer may be a layer of up to a specific rank at which the R-PDCCH can be transmitted.

Figure 20:
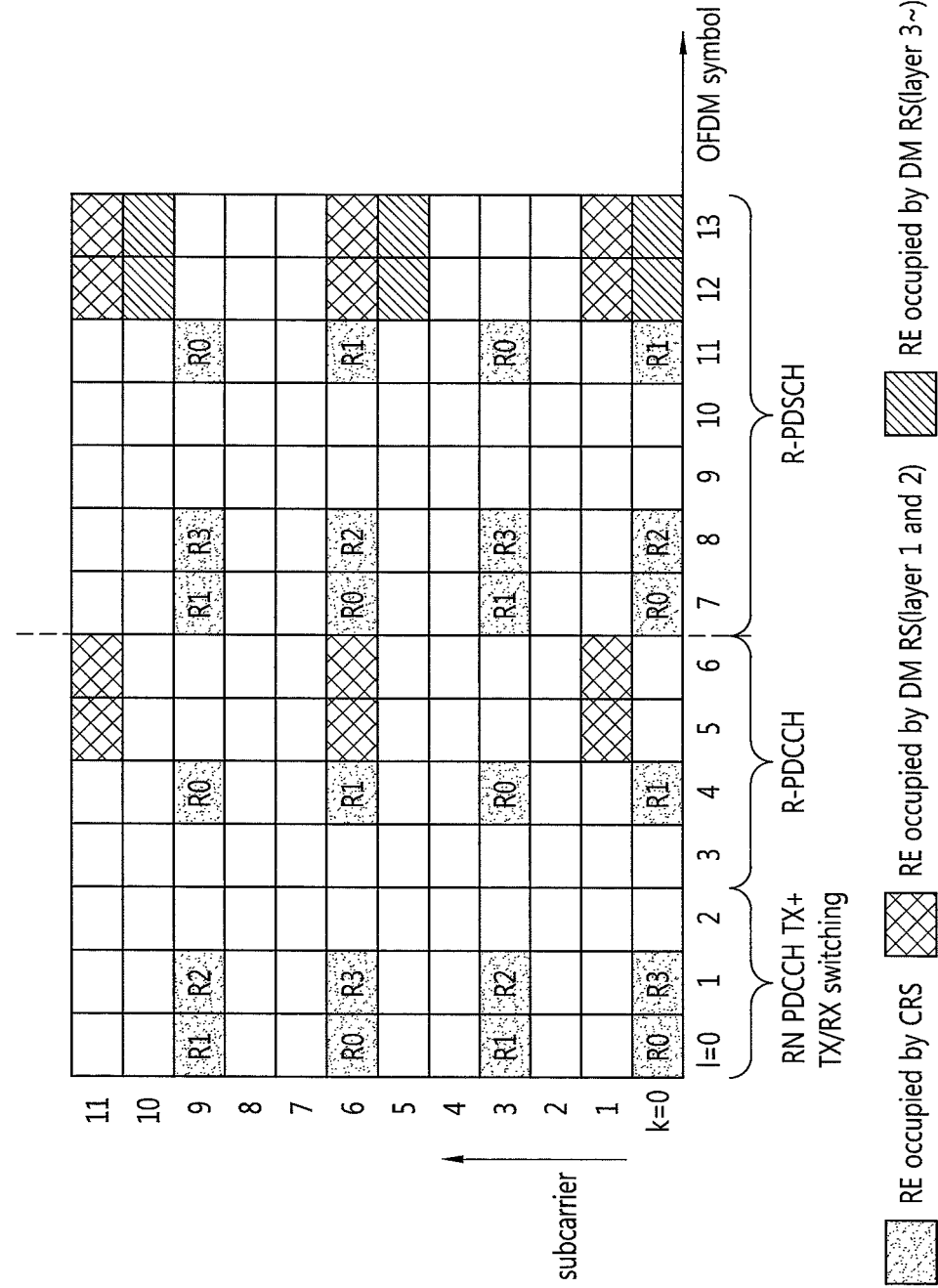
FIG. 20 shows an example in which an eNB maps a DM-RS resource element to an R-PDCCH region and an R-PDSCH region according to a rank.

FIG. 20 shows an example in which an eNB maps a DM-RS resource element to an R-PDCCH region and an R-PDSCH region according to a rank.

For example, if a transmission rank of the R-PDSCH is greater than or equal to 3 and a transmission rank of the R-PDCCH is limited to 2, only a DM-RS (DRS) resource element for layers 1 and 2 is mapped in an OFDM symbol duration in which the R-PDCCH is transmitted. On the other hand, in the R-PDSCH region, the DM-RS resource element for the layers 1 and 2 and a DM-RS resource element for a layer 3 are both mapped. That is, a DM-RS of up to a transmission rank 2 is used in both the R-PDCCH region and the R-PDSCH region, and a DM-RS of a rank 3 or a higher rank is used only in the R-PDSCH region. Resource elements for a CSI-RS can be located in the same symbol as that in which a DM-RS is arranged because there is no dedicated symbol to be used by the CSI-RS. This is useful for an extended CP.

In order to prevent an R-PDCCH from being mapped to a resource element to which a DM-RS can be mapped, the eNB can map the R-PDCCH to N OFDM symbol durations in which the DM-RS is not included. According to this method, the R-PDCCH can be rapidly detected and decoded, and thus the R-PDSCH can also be rapidly detected and decoded. Herein, N can be determined by a high-layer signal. Alternatively, it can be a pre-defined specific value.

If the CSI-RS can be mapped in an OFDM symbol duration in which the R-PDCCH is mapped, mapping of the R-PDCCH may vary depending on whether the CSI-RS is mapped. Therefore, the R-PDCCH may not be mapped in the OFDM symbol to which the CSI-RS is mapped. Alternatively, the R-PDCCH may be mapped to another resource element other than a resource element to which the CSI-RS is mapped. A second method is possible without additional detection of a receiver and decoding complexity. This is because an RN can know whether the CSI-RS exists in the R-PDCCH region by using system information.

The eNB transmits, to the RN, information regarding a type of a backhaul subframe allocated to a backhaul link. The RN can perform demodulation by distinguishing a resource element to which the R-PDCCH is mapped according to the type of the backhaul subframe.

When the backhaul subframe in which the RN receives the R-PDCCH and the R-PDSCH is configured by the eNB as an MBSFN subframe or a fake MBSFN subframe (hereinafter, an MBSFN subframe), the eNB does not perform CRS transmission in an OFDM symbol other than $1^{st}$ and $2^{nd}$ OFDM symbols of the backhaul subframe. This implies that R-PDCCH resource element mapping can vary depending on whether the eNB configures the backhaul subframe as the MBSFN subframe. This is because a specific OFDM symbol duration to which a CRS resource element is inserted in the backhaul subframe varies.

If the eNB signals to the RN a fact that a specific backhaul subframe is the MBSFN subframe and thus the RN can know presence/absence of a CRS in advance, the eNB can transmit the R-PDCCH by mapping it to a resource element other than a CRS resource element. More specifically, the eNB does not map the R-PDCCH to the CRS resource element in a subframe in which the CRS exists, whereas it is possible to map the R-PDCCH to a resource element to which the CRS can be arranged in a subframe in which the CRS does not exist (e.g., an MBSFN subframe).

If information on a type of a backhaul subframe is not given to the RN, the eNB maps the R-PDCCH to a resource element other than a resource element to which the CRS can be allocated irrespective of whether the CRS is actually transmitted. That is, if the RN cannot know in advance whether the specific backhaul subframe is the MBSFN subframe, the R-PDCCH is transmitted by being mapped to the resource element other than the resource element to which the CRS can be allocated.

Figure 21:
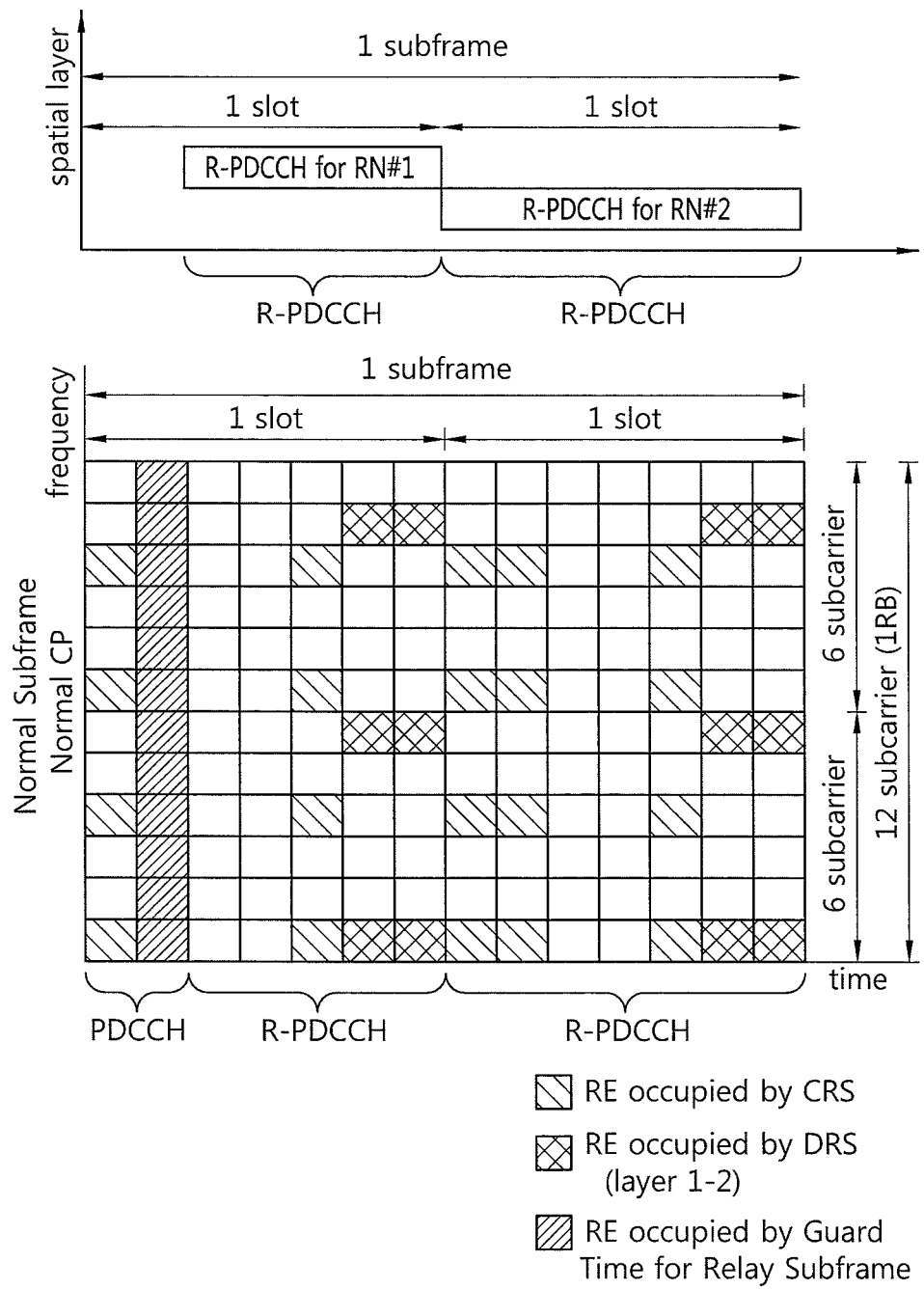
FIG. 21 shows an example of transmitting a plurality of R-PDCCHs to different spatial layers when the plurality of R-PDCCHs are multiplexed in one resource block in a frequency domain.

FIG. 21 shows an example of transmitting a plurality of R-PDCCHs to different spatial layers when the plurality of R-PDCCHs are multiplexed in one resource block in a frequency domain.

An R-PDSCH and an R-PDCCH can be multiplexed by being divided in a frequency domain. For example, this is a case where a resource element of the R-PDCCH and a resource element of the R-PDSCH are not multiplexed in one resource block (i.e., 12 subcarriers) in the frequency domain, but are included in different resource blocks. Herein, the number of resource elements included in one resource in the frequency domain may be greater than the number of resource elements required to reliably transmit the R-PDCCH by the eNB to the RN. In this case, the plurality of R-PDCCHs transmitted to different RNs can be multiplexed in the same resource block in the frequency domain. If the eNB uses a precoded DM-RS when transmitting the aforementioned plurality of R-PDCCHs, it may be difficult to find a precoding vector for providing a good signal to interference plus noise ratio (SINR) for a separated RN.

For this reason, the eNB can perform orthogonal spatial layer transmission between a plurality of RNs. For example, if two R-PDCCHs (i.e., R-PDCCH FOR RN#1, R-PDCCH FOR RN#2) are multiplexed to one resource block in the frequency domain, each R-PDCCH can be transmitted in a different slot.

At the same time, each R-PDCCH can be transmitted in a different DM-RS antenna port. In practice, this has the same meaning as that different R-PDCCHs are mapped to resource elements on different time/frequency domains in one resource block. In order to apply different precoding to each R-PDCCH, the eNB transmits each R-PDCCH through a different DM-RS antenna port. In this case, the R-PDCCH transmitted to each different RN is transmitted to a different spatial layer. Further, a DM-RS for each R-PDCCH is transmitted in a resource element of the same time/frequency domain and is multiplexed in a code region by the use of an orthogonal code. According to this method, the number of resource elements of each R-PDCCH can be prevented from being modified according to whether the plurality of R-PDCCHs are included in one resource block.

If the R-PDCCH and the R-PDSCH are transmitted in a physical resource block (PRB) pair, the number of transmission layers of the R-PDCCH and the number of transmission layers of the R-PDSCHs may be different from each other (see FIG. 13). In this case, the eNB can perform transmission by precoding some resource element groups for transmitting the R-PDCCH by the use of a precoding vector configured with a linear combination of precoding vectors of an R-PDSCH transmission layer, and can perform transmission by precoding the remaining resource element groups by the use of a precoding vector configured with another linear combination of the precoding vectors of the R-PDSCH transmission layer.

For example, assume that the R-PDCCH has one transmission layer, and the R-PDSCH has K transmission layers. In this case, k layers (where k is any one of 0, 1, ..., K−1) of the R-PDSCH are mapped to DM-RS antenna ports $n_0, n_1, \ldots, n_{k-1}$. It is assumed herein that a precoding vector $v_m = [v_{m,0}\ v_{m,1} \ldots v_{m,P-1}]$ (where P is the number of Tx antenna ports) is commonly applied to a transmission layer m of the R-PDSCH and a DM-RS antenna port $n_m$.

Then, resource elements used in R-PDCCH transmission can be grouped into G resource element groups (i.e., R-PDCCH resource element groups). Resource element grouping is preferably performed in such a manner that contiguous resource elements in a time/frequency domain are not included in the same group (herein, a grouping configuration can be predetermined or can be signaled to the RN). A resource element group g (where g is any one natural number from 1 to G) has its combination weight $a_g=[a_{g,0}\ a_{g,1}\ \ldots\ a_{g,k-1}]$. The combination weight can be predetermined or can be signaled to the RN.

When the eNB transmits the R-PDCCH, a signal mapped to resource element of the resource element group g is pre-coded by the use of a precoding vector $a_{g,0}*v_0+a_{g,1}*v_1+\ldots+a_{g,k-1}*v_{k-1}$. That is, precoding is performed by the use of a linear combination vector in which a combination weight of the resource element group g is applied to precoding vectors of the R-PDSCH. In other words, the R-PDCCH resource element groups are precoded by linear combination vectors in which their combination weights are applied to the R-PDSCH precoding vectors. According to this method, a greater spatial diversity gain can be obtained when the eNB transmits the R-PDCCH.

In the aforementioned example, the RN can demodulate the R-PDCCH by using the following procedure.

1. An effective channel (i.e., a channel multiplied by a precoding vector) of each R-PDSCH transmission layer is estimated.

2. An effective channel of each R-PDCCH resource element group is found by applying a combination weight of each R-PDCCH resource element group.

3. R-PDCCH resource elements are demodulated from an effective channel of a corresponding R-PDCCH resource element group.

A combination weight for all R-PDCCH resource elements may be, for example, [1 0 ... 0]. This implies that a precoding vector of an R-PDSCH transmission layer 0 (i.e., a DM-RS antenna port of an R-PDSCH transmission layer 0) is used for the R-PDCCH.

For another example, g=k, $a_0$=[1 0 ... 0], $a_1$=[0 1 0 ... 0], ..., $a_g$=[0 ... 0 1]. In this case, a precoding vector (and a DM-RS antenna port) of an R-PDSCH transmission layer g is used for the R-PDCCH resource element group g, which implies that a precoding vector of each R-PDSCH transmission layer and a DM-RS antenna port are applied to the R-PDCCH. Alternatively, if g is predetermined or is a specific value signaled to the RN, it is possible to use combination weights $a_0$=[1 0 ... 0], $a_1$=[0 1 0 ... 0], ..., $a_g$=[0 ... 0 1].

For another example, as a combination weight of each resource element group (i.e., R-PDCCH resource group), a circular shift of a specific common vector is used. For example, a discrete Fourier transform (DFT) sequence $a_g=[\exp(0*j2\pi g/k)\ \exp(1*j2\pi*g/k)\ \ldots\ \exp((k-1)*j2\pi g/k)]$ can be used as a combination weight of a resource element group. If the number of R-PDSCH transmission layers is 2 and the number of R-PDCCH resource element groups is 2, $a_0$=[1 1] and $a_1$=[1 −1] can be used. This implies that $(v_0+v_1)$ is applied to a resource element group 0, and $(v_0-v_1)$ is applied to a resource element group 1. Alternatively, a DFT sequence $a_g=[\exp(0*j2\pi g/L)\ \exp(1*j2\pi*g/L)\ \ldots\ \exp((L-1)*j2\pi g/L)]$ can be used as a combination weight of a resource element group. Herein, L can be a predetermined value or a value signaled to the RN.

The aforementioned method, i.e., the method of using a combination of one or more R-PDSCH DM-RS sequences as the R-PDCCH DM-RS sequence, is also applicable to a case where a plurality of R-PDCCHs (or some of a plurality of R-PDCCHs) are transmitted in one PRB pair.

For example, it is assumed that L different R-PDCCHs are transmitted in one PRB pair (herein, L may be a predetermined value or a value signaled to the RN). Further, it is also assumed that k DM-RS antenna ports are used for the L R-PDCCHs (herein, k may be a predetermined value or a value signaled to the RN). Then, signals transmitted from different R-PDCCHs are mapped to different resource elements. That is, the signals are mapped to orthogonal time/frequency resources. Resource elements used in R-PDCCH transmission are grouped similarly to the aforementioned method. The resource element group g can have a combination weight $a_g$, and an R-PDCCH signal transmitted in the resource element group g can be precoded by a precoding vector $a_{g,0}*v_0+a_{g,1}*v_1+\ldots+a_{g,k-1}*v_{k-1}$.

For example, assume that L=2, k=2, $a_0$=[1 1], $a_1$=[1−1]. Further, it is also assumed that among resource elements of the PRB pair, even resource elements (e.g., resource elements 0, 2, 4, ...) are included in a resource element group 0, and odd resource elements (i.e., resource elements 1, 3, 5, ...) are included in a resource element group 1. Then, two R-PDCCHs can be transmitted as follows.

1. The resource element 0 is used in the R-PDCCH 0, and a precoding vector $(v_0+v_1)$ can be used. 2. The resource element 1 is used in the R-PDCCH 0, and a precoding vector $(v_0-v_i)$ can be used. 3. The resource element 2 is used in the R-PDCCH 1, and a precoding vector $(v_0+v_1)$ can be used. 4. The resource element 3 is used in the R-PDCCH 1, and a precoding vector $(v_0-v_1)$ can be used. The aforementioned resource element allocations 1 to 4 are repeated for all resource elements of the PRB pair.

When an R-PDCCH is demodulated by using a DM-RS to support effective multi-user MIMO in a backhaul resource, the eNB can indicate an antenna port of a DM-RS of the R-PDCCH for each RN. Alternatively, the eNB can indicate a scramble ID of a DM-RS antenna port 0 of the R-PDCCH transmitted to each RN. Alternatively, the eNB can indicate a combination of the scramble ID and the DM-RS antenna port of the R-PDCCH transmitted to each RN. The scramble ID of the DM-RS antenna port is in regard to a DM-RS antenna port different from a DM-RS antenna port used to schedule a different multi-user MIMO resource in a space domain. The aforementioned DM-RS index can be given by the DM-RS antenna port, the scramble ID, or a combination of the two.

R-PDCCH transmission to the RN can be performed by the eNB by using a DM-RS antenna port which is not predetermined. This implies that the RN blindly detects the R-PDCCH by using a DM-RS antenna port (and/or a scramble ID) which cannot be pre-known in the R-PDCCH resource. According to this method, instead of transmitting DM-RS antenna port (and/or scramble ID) information of the R-PDCCH and the R-PDSCH to the RN in advance, the eNB may dynamically perform multi-user MIMO transmission with respect to resources of the RN.

When the RN performs blind detection on the R-PDCCH, it may be effective to restrict a DM-RS antenna port used for R-PDCCH transmission. For example, in order to demodulate the R-PDCCH, it can be restricted such that only a DM-RS antenna port 0 and a DM-RS antenna port 1 are used. According to this example, a reference signal overhead can be minimized by allowing two antenna ports to share the same resource elements and to be divided along a code axis (i.e., CDM).

Alternatively, it can be restricted such that only the DM-RS antenna ports 0 and 2 are used for R-PDCCH demodulation. According to this method, there is an advantage in that an R-PDSCH transmission rank for each RN can be extended up to 2 in multi-user MIMO. The RN can demodulate its R-PDCCH by using the DM-RS antenna port 0 and at the same time, can demodulate an R-PDSCH received with a transmission rank 2 by using the DM-RS antenna ports 0 and 2. The RN which modulates its R-PDCCH by using the DM-RS antenna port 2 can demodulate an R-PDSCH received with a transmission rank 2 by using the DM-RS antenna ports 2 and 3. For this operation, the RN performs demodulation by assuming that an R-PDCCH signal is mapped with a maximum DM-RS overhead (e.g., by assuming that 24 resource elements are mapped in a resource block). However, if the entire transmission rank is less than or equal to 2, an actual DM-RS overhead may be further decreased (in a case of mapping to 12 resource elements in a resource block). As a result, a $1^{st}$ slot in which the R-PDCCH is transmitted may have a higher DM-RS overhead than a $2^{nd}$ slot in which the R-PDSCH is transmitted.

Figure 22:
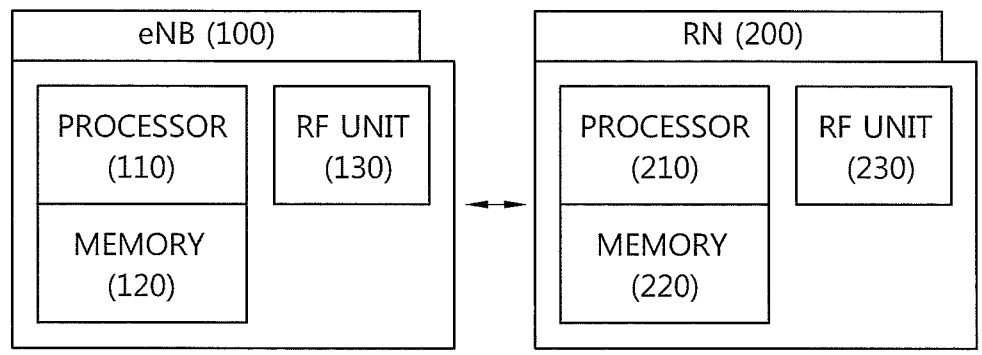
FIG. 22 is a block diagram showing an eNB and an RN.

FIG. 22 is a block diagram showing an eNB and an RN.

An eNB 100 includes a processor 110, a memory 120, and a radio frequency (RF) unit 130. The processor 110 implements the proposed functions, procedures, and/or methods. That is, the processor 110 transmits information regarding a DM RS used for demodulation of an R-PDCCH through a high-layer signal, and transmits information regarding a dedicated reference signal for an R-PDSCH in the R-PDCCH. The processor 110 transmits a maximum transmission rank value of a backhaul downlink or a maximum transmission rank value of an RN-specific backhaul downlink through a high-layer signal, and transmits to the RN an R-PDCCH for which the rank value is assumed. The memory 120 coupled to the processor 110 stores a variety of information for driving the processor 110. The RF unit 130 coupled to the processor 110 transmits and/or receives a radio signal.

An RN 200 includes a processor 210, a memory 220, and an RF unit 230. The processor 210 receives a maximum transmission rank value of a backhaul downlink or a maximum transmission rank value of an RN-specific backhaul downlink through a high-layer signal such as an RRC message, receives control information from the eNB through a control region, and decodes the control information. In the process of decoding the control information, the processor 210 decodes an R-PDCCH by assuming a maximum transmission rank value of a backhaul downlink or a maximum transmission rank value of an RN-specific backhaul downlink. After decoding the R-PDCCH, the R-PDSCH can be decoded by using decoded control information. Layers of a radio interface protocol can be implemented by the processor 210. The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of decoding a backhaul downlink signal, performed by a relay node (RN), the method comprising:
   receiving a higher layer signal indicating a maximum transmission rank from a base station (BS);
   receiving control information containing a resource allocation for downlink data through a relay control channel from the BS;
   demodulating the control information; and
   receiving the downlink data through a data channel based on the control information,
   wherein the control information is mapped to resource elements (REs) which do not overlap with user equipment-specific reference signal (URS) REs in a control region which is used for the relay control channel transmission of the BS, the URS REs being reserved REs for URSs according to the maximum transmission rank.

2. The method of claim 1, wherein the control region is located in a first slot of a subframe, the subframe comprises two slots and each slot of the two slots comprises a plurality of REs.

3. The method of claim 1, wherein each of the plurality of REs comprises an orthogonal frequency division multiplexing (OFDM) symbol in time domain and a subcarrier in frequency domain.

4. The method of claim 1, wherein the maximum transmission rank is equal to a maximum rank that can be transmitted between the BS and the RN.

5. The method of claim 1, wherein the data channel is received in a same subframe in which the relay control channel is received.

6. The method of claim 5, wherein the relay control channel is received in a first slot of the same subframe and the data channel is received in a second slot of the same subframe.

7. The method of claim 1, wherein the higher layer signal is a radio resource control (RRC) message.

8. A relay node (RN) comprising:
   a radio frequency (RF) unit configured to transmit and receive a radio signal; and
   a processor coupled to the RF unit,
   wherein the processor is configured to:
      receive a higher layer signal indicating a maximum transmission rank from a base station (BS);
      receive control information containing a resource allocation for downlink data through a relay control channel from the BS;
      demodulate the control information; and
      receive the downlink data through a data channel based on the control information,
   wherein the control information is mapped to resource elements (REs) which do not overlap with user equipment-specific reference signal (URS) REs in a control region which is used for the relay control channel transmission of the BS, the URS REs being reserved REs for URSs according to the maximum transmission rank.

9. The RN of claim 8, wherein the control region is located in a first slot of a subframe, the subframe comprises two slots and each slot of the two slots comprises a plurality of REs.

10. The RN of claim 8, wherein each of the plurality of REs comprises an orthogonal frequency division multiplexing (OFDM) symbol in time domain and a subcarrier in frequency domain.

11. The RN of claim 8, wherein the maximum transmission rank is equal to a maximum rank that can be transmitted between the BS and the RN.

12. The RN of claim 8, wherein the data channel is received in a same subframe in which the relay control channel is received.

13. The RN of claim 12, wherein the relay control channel is received in a first slot of the same subframe and the data channel is received in a second slot of the same subframe.

14. The RN of claim 8, wherein the higher layer signal is a radio resource control (RRC) message.

* * * * *